US009401891B2

(12) United States Patent
Gopalakrishnan et al.

(10) Patent No.: US 9,401,891 B2
(45) Date of Patent: Jul. 26, 2016

(54) NETWORK ADDRESS TRANSLATION TRAVERSALS FOR PEER-TO-PEER NETWORKS

(71) Applicant: Microsoft Technology Licensing, LLC, Redmond, WA (US)

(72) Inventors: Palamalai Gopalakrishnan, Seattle, WA (US); Craig H Wittenberg, Mercer Island, WA (US); Jin Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 14/138,709

(22) Filed: Dec. 23, 2013

(65) Prior Publication Data
US 2014/0115174 A1   Apr. 24, 2014

Related U.S. Application Data

(63) Continuation of application No. 11/772,045, filed on Jun. 29, 2007, now Pat. No. 8,631,155.

(51) Int. Cl.
*G06F 15/16* (2006.01)
*H04L 29/12* (2006.01)
*H04L 29/08* (2006.01)

(52) U.S. Cl.
CPC ...... *H04L 61/2503* (2013.01); *H04L 29/12528* (2013.01); *H04L 61/2575* (2013.01); *H04L 61/6068* (2013.01); *H04L 67/104* (2013.01)

(58) Field of Classification Search
CPC ............... H04L 29/12528; H04L 61/2575; H04L 61/2503
See application file for complete search history.

(56) References Cited

U.S. PATENT DOCUMENTS

| 7,302,496 | B1 | 11/2007 | Metzger |
| 7,933,273 | B2 | 4/2011 | Takeda et al. |
| 2004/0088537 | A1 | 5/2004 | Swander et al. |
| 2004/0139228 | A1 | 7/2004 | Takeda et al. |
| 2005/0005014 | A1* | 1/2005 | Holmes et al. ............... 709/227 |
| 2006/0072569 | A1 | 4/2006 | Eppinger et al. |
| 2006/0075127 | A1 | 4/2006 | Juncker et al. |
| 2006/0182100 | A1* | 8/2006 | Li et al. ........................ 370/389 |

(Continued)

OTHER PUBLICATIONS

Office Action for U.S. Appl. No. 11/772,045, mailed on Apr. 27, 2011, Palamalai Gopalakrishnan, "Network Address Translation Traversals for Peer-to-Peer Networks," 7 pages.

(Continued)

*Primary Examiner* — Richard G Keehn
*Assistant Examiner* — Mohammed Ahmed
(74) *Attorney, Agent, or Firm* — Damon Rieth; Tom Wong; Micky Minhas

(57) ABSTRACT

In a networking environment, multiple end-users applications running on computing devices may operate behind a respective NAT device. Information transferred from one end-user application to another can be accomplished by establishing a connection from one private network to another. The NAT device translates information related to an end-user application operating within a private network to information that is understood by the public network environment. This translated information is communicated to the associated NAT device of the intended recipient. The NAT device of the intended recipient translates the public environment related information to information for the end-user in the private network.

20 Claims, 16 Drawing Sheets

(56) References Cited

U.S. PATENT DOCUMENTS

| | | | |
|---|---|---|---|
| 2006/0215652 A1* | 9/2006 | Strandridge | H04L 12/24 370/389 |
| 2007/0217407 A1 | 9/2007 | Yuan et al. | |
| 2008/0288580 A1* | 11/2008 | Wang et al. | 709/203 |
| 2008/0317020 A1 | 12/2008 | Horne | |
| 2009/0006648 A1 | 1/2009 | Gopalakrishnan et al. | |
| 2009/0028167 A1 | 1/2009 | Takeda et al. | |

OTHER PUBLICATIONS

Final Office Action for U.S. Appl. No. 11/772,045, mailed on Aug. 18, 2011, Palamalai Gopalakrishnam, "Network Address Translation Traversals for Peer-to-Peer Networks," 10 pages.

* cited by examiner

US 9,401,891 B2

NETWORK ADDRESS TRANSLATION TRAVERSALS FOR PEER-TO-PEER NETWORKS

RELATED APPLICATION

This application is a continuation of and claims priority to U.S. patent application Ser. No. 11/772,045, filed on Jun. 29, 2007, the disclosure of which is incorporated by reference herein.

BACKGROUND

In computer networking, the process of network address translation (NAT) includes translating the source and/or destination addresses of Internet protocol or IP packets as they pass through a networking component such as a router or a firewall. Most systems using NAT enable multiple hosts on a private network to access the Internet using a single public IP address. Systems implementing such network address translation may also referred to as network address translators or NATs.

When a private user working on an internal network, such as a small business network, connects to an Internet resource, the user's TCP/IP protocol creates an IP packet. The IP packet is characterized by one or more values which are private to the network and are defined in the IP and transmission control protocol (TCP) or user datagram protocol (UDP) headers. The source host or another network component forwards the IP packet to the network address translator (NAT).

While transmitting the IP packet, the NAT can translate the one or more of the values characterizing the IP packet to values characteristic of a public network, i.e. the Internet. Subsequently the IP packet with the translated value is communicated to the destination address, and all responses to such transmission are communicated back to the NAT.

Currently, communication between end-user applications across a public network, such as the Internet, can be implemented using a relay server. The relay server acts as an interface between one or more applications that seek to communicate with each other. Such an implementation has disadvantages due to increased overhead at the relay server, delay between communicating applications, etc. Furthermore, network situations may require more than one protocol to be employed to effectively communicate between the end-user applications.

SUMMARY

This summary is provided to introduce concepts for implementing NAT traversals for a peer-to-peer network. These concepts are further described below in the detailed description. This summary is not intended to identify essential features of the claimed subject matter, nor is it intended for use in determining the scope of the claimed subject matter.

In an embodiment, a network address translator transversal mechanism is implemented by communicating properties of the network address translator to a listening client, communicating connection attributes of the listening client to a target client, establishing a connection between the listening client and the target client, and completing, and completing the communication link between the listening client and the target client.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
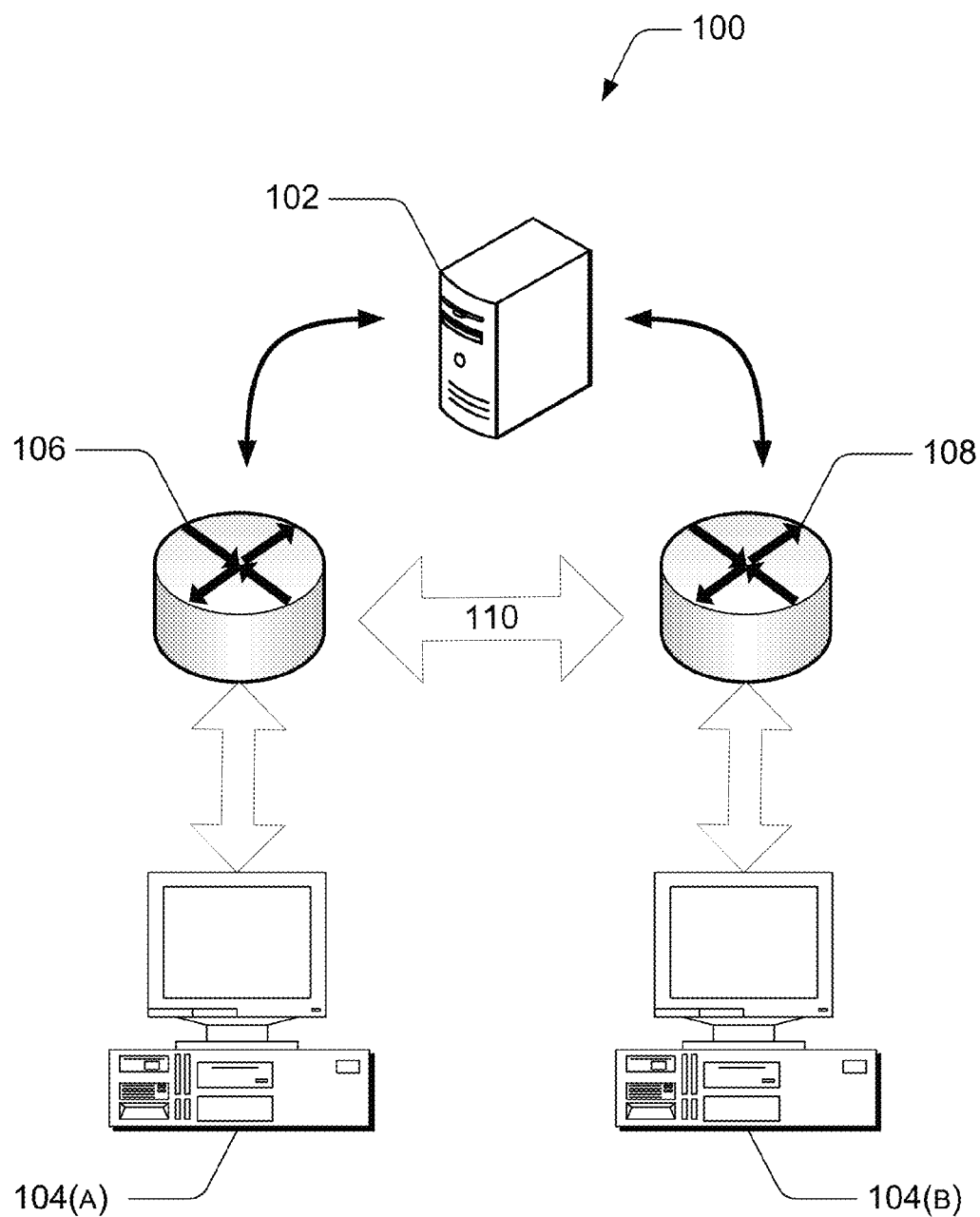
FIG. 1 illustrates an exemplary NAT traversal system.

Systems and methods for implementing network address translation or NAT traversals are described. Network address translation can be affected by one or more hardware devices referred to as translators. Such translators may be referred to as Network Address Translators or NATs.

In a public networking environment, each of the multiple end-users applications may operate behind a respective NAT device. The end-user applications run on computing-based devices that form part of a private network. The private network can be connected to other private networks or end-users on computing-based devices through a public network. Information that is to be transferred from one end-user application to another can be accomplished by establishing a connection from one private network to another. A typical NAT implementation may not allow a direct link to be established between the private networks. The NAT device translates information related to an end-user application operating within a private network to information that is amicable to (i.e., understood by) the public network environment. This translated information is communicated to the associated NAT device of the intended recipient. The NAT device of the intended recipient again translates the public environment related information to information for the end-user in the private network.

Communication over a network may generally be performed in packets (e.g., Internet protocol or IP packets). The packets may be characterized by information that relates to the source address of the data, the destination address to which the data has to be transmitted, etc. Before the data packets can be transmitted over the network, a communication link may be established between the end-users. As discussed above, NAT devices may disallow end-users to communicate directly with the other end-users. Forms of communication may be routed through the NAT devices in accordance with various protocols. For example, the communication between the NAT devices and the end-users can be implemented using protocols such as TCP, UDP, and the like.

To this end, the NAT devices can initiate communication between pluralities of end-users applications. The end-user applications can reside on one or more computing-based devices. Each of the computing-based devices can form a part of network (e.g., a private network) or a computing-based device may exist as a standalone device. Computing-based devices can be identified by identifiers or addresses, like an IP address, that are unique to the computing-based devices. The IP addresses may be such that the IP addresses are private to the network to which the computing-based devices are a part. Two or more private networks can be connected to each other through a public network.

In communicating between one or more end-user applications, a connection may not directly be established between the end-user applications. One or more programmable agents or modules may first communicate one or more connection attributes associated with a requesting end-user application which attempts to establish a communication with another intended end-user. The connection attributes may be first communicated using an intermediate server, referred to as a relay server. The relay server provides a mechanism for transmitting connection attributes of the requesting end-user to the intended end-user. Once the connection attributes of the requesting end-user are acquired, the intended end-user can connect to the requesting end-user through their corresponding NAT devices.

While aspects of described systems and methods relating to NAT traversals can be implemented in any number of different computing systems, environments, and/or configurations, embodiments of system analysis and management are described in the context of the following exemplary system architecture(s).

An Exemplary NAT Traversal System

FIG. 1 illustrates an exemplary system 100 for NAT traversals. System 100 includes a relay server 102 and client devices 104(A)-(B), collectively referred to as client devices 104. The client devices 104 are operably connected to the relay server 102. Each of the client devices 104 are prefixed with a NAT device 106, 108 respectively. The NAT devices 106, 108 provide a mechanism for providing a communication link 110 between the client devices 104. The NAT devices 106, 108 can be any of the known NAT devices, for example, a symmetric NAT, a direct IP, an UPnP enabled NAT, a full cone NAT, ISA proxy, etc. The communication link 110 can be established using a variety of data transfer related protocols such as TCP, UDP, and so on.

Moreover, system 100 can include any number of computing-based devices 104. It would be appreciated that the client devices 104 may form constituent computing devices in a private network. Examples of such a private network include, but are not limited to internal networks which include the client devices 104. For example, in an implementation, system 100 can be a company network, including thousands of office personal computers (PCs), various servers, and other computing-based devices spread throughout several countries. Alternately, in another possible implementation, system 100 can include a home network with a limited number of PCs belonging to a single family.

To illustrate an example of the system 100 communications, client devices 104(A)-(B) can be two clients intending to establish a connection between them. The client devices 104(A)-(B) determine the respective NAT property associated with their respective NAT devices 106, 108. The NAT property can include attributes pertinent to the type of NAT device that is being implemented. For example, each of the NAT devices 106, 108 can be characterized by an IP address, a relevant port numbers, etc. The NAT devices 106, 108 generally act as interfaces between a private network, to which the client devices 104 are a member, and a public network, such as the Internet. The public network provides a communicating mechanism between one or more NAT devices.

The NAT devices 106, 108 can also be associated with one or more connection attributes. For example, the connection attributes can be an IP address and a port address associated with the NAT devices 106, 108. The association of these connection attributes may be two ways. The connection attributes can be specified for the NAT devices 106, 108 such that one set of connection attributes (referred to as internal connection attributes) are pertinent to the private network to which the NAT device under consideration is associated. The other set of connection attributes (referred to as external connection attributes) allow communication and transmission over the public network. Therefore during operation, if a communication is directed from one of the NAT devices 106, 108 to the destination device, then the private network connection attributes are first translated into public connection attributes which are used for affecting the communication from one end-user to the other. When the destination device receives communication on the basis of public connection attributes.

In order to commence communication between the client devices 104(A)-(B), the connection attributes of at least one of the client device 104 should be with the other client device 104. For example, in order to initiate communication between client devices 104, connection attributes of a requesting client device 104, for example client device 104(A), are communicated to the other client device 104, or client device 104(B). The connection attributes are routed through relay server 102, to the client device 104(B). The client device 104(B) attempts to connect to the client device 104(A) on the basis of the received connection attributes. Once a communication 110 is established, the client devices 104, and in turn, NAT devices 106, 108, can communicate using the link 110, without actually routing communication traffic through the relay server 102.

In an implementation, connection attributes of client device 104(B) can be communicated to client device 104(A), and communication can be initiated by client device 104(A). The manner in which communication is established between the client devices 104 can be dependent on the type of the NAT devices 106, 108 that are associated with the respective client devices 104. It would be appreciated that the communication between one or more of the NAT devices 106, 108 can be dictated by known NAT protocols. It would be noted that the communication between client devices 104 can be a result of one or more applications that may be executing on the client devices 104. Examples of such applications include MSN® messenger, and the like.

The NAT devices 106, 108 could be such that they support any of known NAT types that are generally used. Examples of such NAT types include a direct IP, an UPnP NAT, a full cone NAT, a restricted cone NAT or a port restricted NAT, symmetric NAT, etc. The various types of NAT differ in the varying degree of the restriction it imposes on the incoming communication from the public network. For example, communication to a direct IP address synthesized image may be less restrictive as compared to a communication to UPnP NAT. The various types of NATs can be arranged as follows, in the increasing order of their restrictive operation: direct IP, restricted cone NAT, symmetric NAT, ISA proxy.

Exemplary NAT Device(s)

Figure 2:
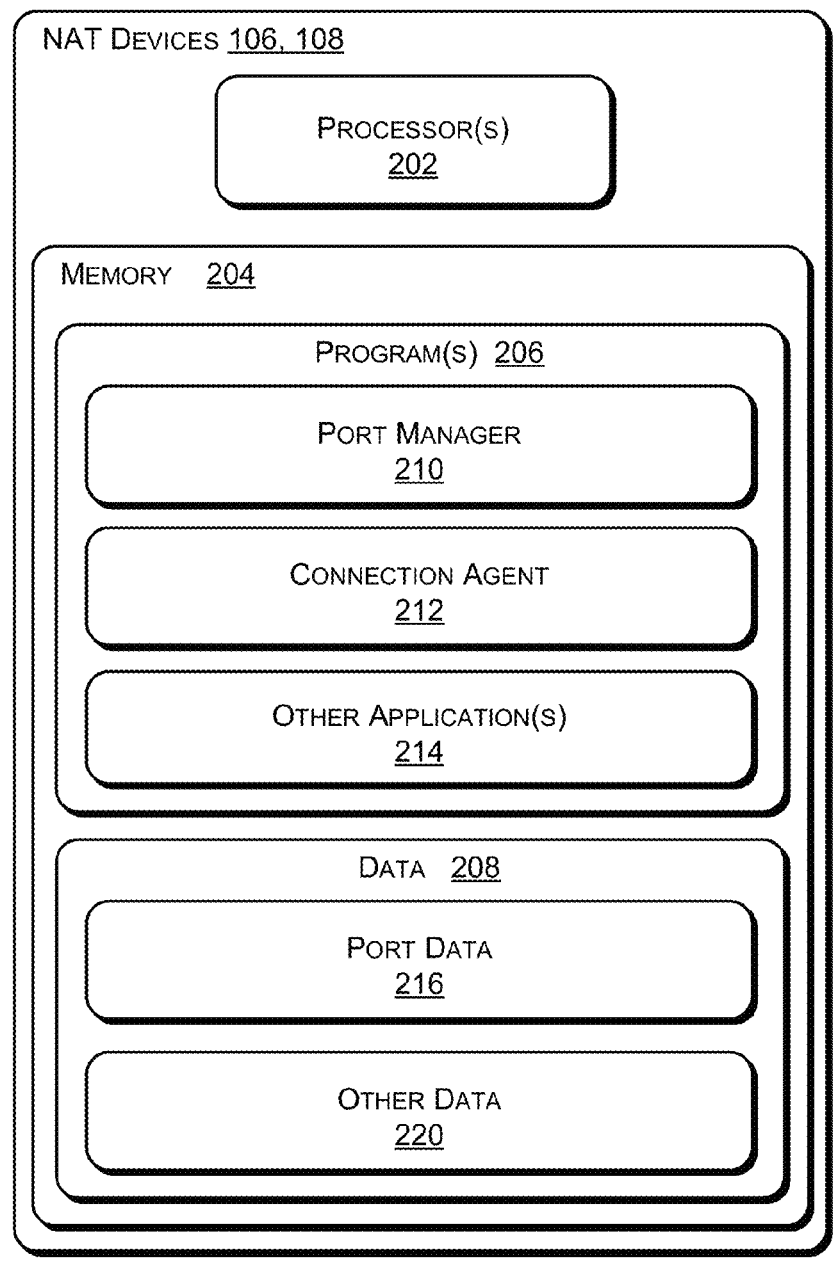
FIG. 2 illustrates an exemplary translating device.

FIG. 2 illustrates relevant exemplary components of NAT devices 106, 108 NAT devices 106, 108. NAT devices 106, 108 can include one or more processor(s) 202 and a memory 204. Processor(s) 202 may include microprocessors, microcomputers, microcontrollers, digital signal processors, central processing units, state machines, logic circuitries, and/or any devices that manipulate signals based on operational instructions. Among other capabilities, processor(s) 202 are configured to fetch and execute computer-readable instructions stored in memory 204.

Memory 204 can include any computer-readable medium known in the art including, for example, volatile memory (e.g., RAM) and/or non-volatile memory (e.g., flash, etc.). Memory 204 also can include program(s) 206 and data 208. Program(s) 206 include can include port manager 210, connection agent 212, and other application(s) 214. Other application(s) 214 include programs that supplement applications on any computing based device such as process receiving applications, update applications, etc. Data 208 includes data stored and used by one or more of the program(s) 206 or data generated as a result of the execution of any one of the program(s) 206. For example, port data 216 can be fetched by port manager 210 to enable identification of port addresses for one of the NAT devices 106, 108. Data 208 also includes other data 218.

The communication between one or more client devices 104 begins with one of the device, for example client device 104(A), requesting the other client device, for example client device 104(B), for communication. The client devices 104 may be constituents of a private network. Each of the client devices 104 in the private network is identifiable through an IP address. It would be realized that each of the IP address are such that they are private to a specific network. While communicating information between client devices, transmission is implemented such that information is first routed through the NAT device 106 for client device 104(A), through the public network, and finally received by the NAT device 108 for the client device 104(B). The NAT device 108 serves to process the information received, making it amicable to the private network environment of the client device 104(B).

The NAT devices 106, 108 can be associated with internal and external connection attributes, such as a port number, an IP address, etc. Information in relation to the internal and the external connection attributes can be stored in port data 216. In order to establish communication between the client devices 104, the external connection attributes of one of the NAT devices 106, 108 can be communicated to the other client device 104 through the relay server 102. To implement this, client device 104 can gather information about the external connection attributes of the NAT device 106, 108 to initiate communication with another client device 104.

Initially both the client devices 104 gather information about their associated NAT types of NAT devices 106, 108. For example, the client devices 104 may discover whether the NAT devices 106, 108 are UPnP Enabled NAT or Restricted Cone or Symmetric or ISA proxy NAT devices. Once the NAT types are known to each other, they are communicated to the other client devices 104 through the relay server 102. Client devices 104 gather the NAT types being implemented by their respective NAT devices 106, 108. The information in relation to the NAT types is exchanged between the client devices 104. Depending on the NAT type, a client device 104 assumes the role of a listener. For example, if client device 104(A) gathers that it is connected to a less restrictive NAT than client device 104(B), then client device 104(A) assumes the role of a listener. A listening device typically communicates its connection attributes to other client devices 104 and waits for further contact from their side. As discussed above, connection attributes can include an IP address, a port related addresses, etc.

For example, client device 104(A) acting as the listening device, instructs NAT device 106 to open an external port if it is a UPnP enabled NAT. If the NAT device 106 is a non-UPnP then port mapping is done on client device 104 using ECHO/STUN servers to predict the external port. The predicted external port is then communicated from client device 104(A) to client device 104(B) via relay server 102. The port data 216 sent by client device 104(A) is routed through the relay server 102 to the client device 104(B).

Once the port data 216 is received by client device 104(B), client device 104(B) can instruct NAT device 108 to establish a communication link 110 between client device 104(A) and client device 104(B). The link 110 can be established by client device 104(B) itself creating a communication link to client device 104(A), or client device 104(B) sending its own connection attributes or related port data to client device 104(A). As client device 104(A) receives port data of client device 104(B), it can proceed to create a link 110 to client device 104(A). The manner in which the link 110 is created is dependent on the NAT type being implemented by the NAT devices 106, 108. Various combinations of the different NAT types implemented and their working is further described in detail in conjunction with FIG. 3 through FIG. 16.

Exemplary Method(s)

Exemplary methods for various mechanisms of NAT traversals are described with reference to FIGS. 1 and 2. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Direct IP to NAT Traversal Logic

Figure 3:
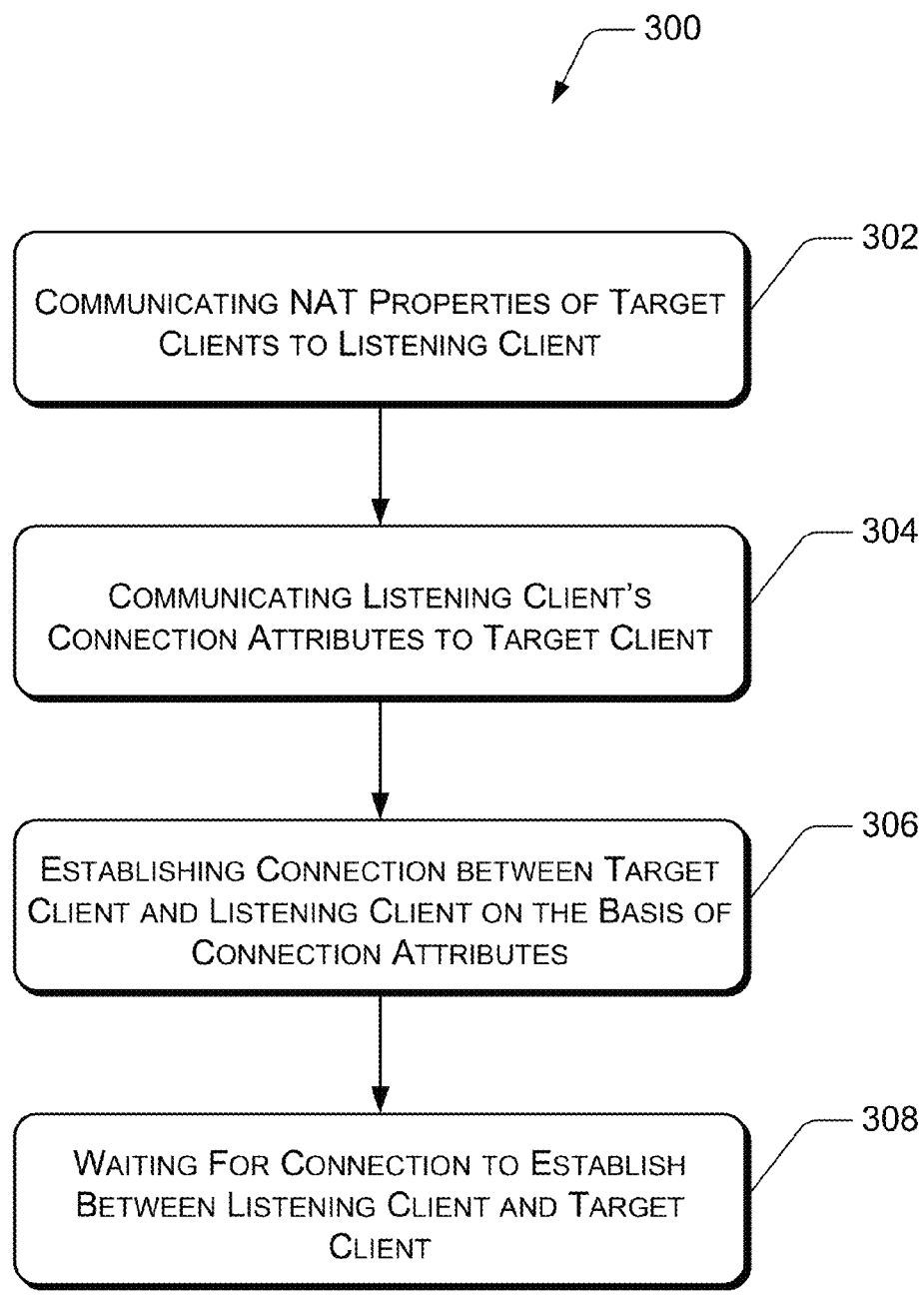
FIG. 3 illustrates a process for implementing a NAT traversal mechanism between a direct Internet protocol (IP) address and any other NAT type.

FIG. 3 illustrates an exemplary method 300 implementing a NAT traversal mechanism between a direct IP and any other NAT type. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

Communication between a direct IP and any other type of NAT is illustrated. For example, client device 104(A) can be an end-user that supports communication through a direct IP. In such a case, client device 104(A) need not be associated with a NAT device, say NAT device 106. Therefore, only one client device namely, client device 104(B), would be behind a NAT device, say NAT device 108. In one implementation, client device 104(A) and NAT device 106 can be considered to be apart of a single functional block that supports direct IP. For purposes of this section, only reference to the client device 104(A) would be made; however, it is to be understood that the same can be realized by associating with a NAT device 106 supporting direct IP.

At block 302, NAT properties of a target client are communicated to a listening client. For example, listening client device 104(A), is identifiable as a direct IP address. Since a direct IP type NAT is the least restrictive, client device 104(A) would be acting as a listening client. The target client, for example client device 104(B), which is willing to establish a direct communication with client device 104(A), will be unable to do so as it is unaware of the connection attributes, for example the port and IP address, on which the client device 104(A) is listening. The NAT type information of NAT device 108 associated with the client device 104(B) is routed through the relay server 102 to client device 104(A) by client device 104(B).

At block 304, connection attributes of the listening client are communicated to the target client. For example, on receiving the NAT type information of the client device 104(B), client device 104(A) would create a connection attribute, for example a port. Information associated with the opened port can be stored as port data, say port data 216 associated with client device 104(A). The client device 104(A) then communicates the relevant client device 104(A) port data and the associated IP address to client device 104(B). In one implementation, the connection attributes of client device 104(A) is communicated to client device 104(B) through the relay server 102.

At block 306, a connection is established between the target client and the listening client on the basis of the connection attributes received by the target client. For example, client device 104(B), on receiving the relevant port information and IP address, creates a communication link 110 between client device 104(A) and client device 104(B). In one implementation, client device 104(B) instructs NAT device 108, particularly connection agent 212, to establish a communication link 110 between client device 104(A) and client device 104(B).

At block 308, both the listening client and the target client wait for the communication link to be complete. For example, once communication link 110 is complete, the listening client, that is the client device 104(A) and the target client, that is the client device 104(B), can communicate directly with each other. Further communication is accomplished directly between client device 104(A) and client device 104(B) without relaying any messages through the relay server 102.

UPnP NAT to NAT Traversal Logic

Figure 4:
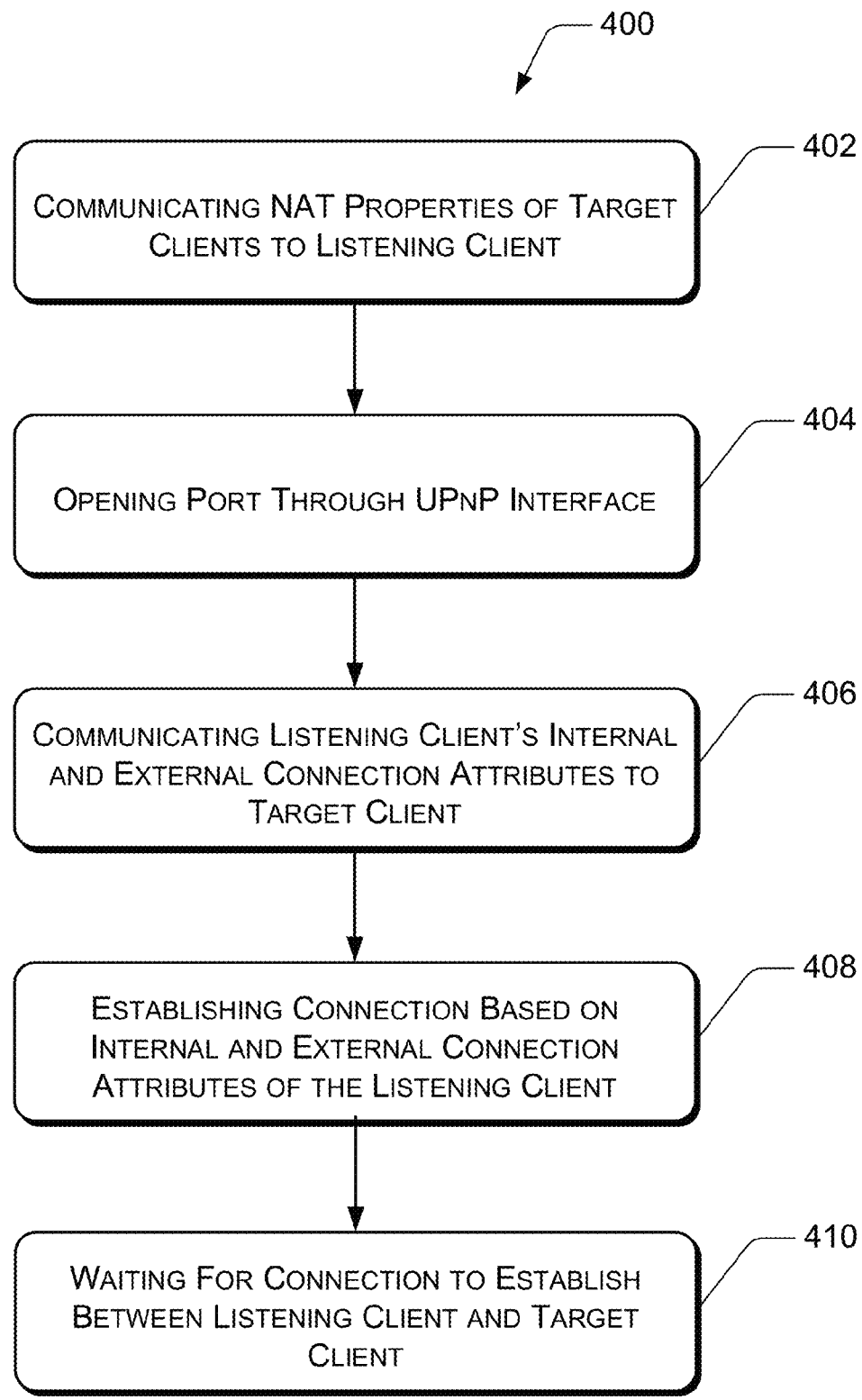
FIG. 4 illustrates a process for implementing a NAT traversal mechanism between an UPnP NAT and any other NAT type that is more restricted as compared to UPnP NAT.

FIG. 4 illustrates an exemplary method 400 implementing a NAT traversal mechanism between a UPnP NAT and any other NAT type that is more restricted as compared to UPnP NAT. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

Universal Plug and Play (UPnP) is a set of computer network protocols that allow devices to connect seamlessly and to simplify the implementation of networks in the home (data sharing, communications, and entertainment) and corporate environments. As indicated previously, restricted cone NAT, symmetric cone NAT, ISA proxy supported NAT, are more restrictive than UPnP NAT. Functionally UPnP NAT is more or less similar NAT devices supporting communication through direct IP.

At block 402, NAT properties of a target client are communicated to a listening client. For example, client device 104(B) wishes to establish a direct communication with client device 104(A). The target client, that is client device 104(B), which is willing to establish a direct communication with client device 104(A), will be unable to do so as it is unaware of the connection attributes, say the port and IP address, on which the client device 104(A) is listening. Client device 104(B) communicates the NAT type being implemented by NAT device 108. The NAT type information of the client device 104(B) is routed through the relay server 102 to client device 104(A).

At block 404, a UPnP port is created and opened at the UPnP NAT. For example, client device 104(A) will instruct the UPnP NAT device, say NAT device 106 to open an external port. The NAT device 106 will open a port through an UPnP NAT interface. Typically, a port can only be opened if a data packet is sent first from the NAT device, say NAT device 106. This limitation is however not present in NAT devices that implement UPnP NAT. In an implementation, port manager 210 of NAT device 106 can open a port through a UPnP NAT interface. Information in relation to the port can be communicated to the client device 104(A). In another implementation, the port related information can be stored as port data 216 in NAT device 106.

At block 406, the listening client's external and internal connection attributes are communicated to the target client. As indicated previously, any NAT device acts as an interface between a private network, such as a company network, and a public network, such as the Internet. The NAT device is so instrumented to enable it to interact with the private network through internal connection attributes, and to interact with the public network through external connection attributes. For example, the internal and the external port and IP address of the client device 104(A) are gathered by the client device 104(A). The acquired internal and external connection attributes are communicated to the target client, say client device 104(B). The connection attributes are communicated to client device 104(B) indirectly through the relay server 102. In one implementation, the connection attributes once communicated to the client device 104(B) can be stored as port data 216 in NAT device 108.

At block 408, a connection is established by the target client on the basis of the internal and the external connection attributes. For example, on receiving the internal and the external connection attributes, like port and IP address, the client device 104(B) instructs the NAT device 108 to establish a connection to the addresses as specified by both the connection attributes. In one implementation, connection can be established by connection agent 212 in NAT device 108. The connection agent 212 attempts to establish a connection to both the addresses specified by the internal and the external connection attributes. The address to which the communication link 110 is established first is used only. For example, if the connection agent 212 establishes a connection with the address as specified by the internal connection attributes, then that connection is retained only.

At block 410, both the listening client and the target client wait for the communication link to be complete. For example, once communication link 110 is complete, the listening client, that is the client device 104(A) and the target client, that is the client device 104(B), can communicate directly with each other. Further communication is accomplished directly between client device 104(A) and client device 104(B) without relaying any messages through the relay server 102.

Restricted Cone NAT to Restricted Cone NAT Traversal Logic

Figure 5:
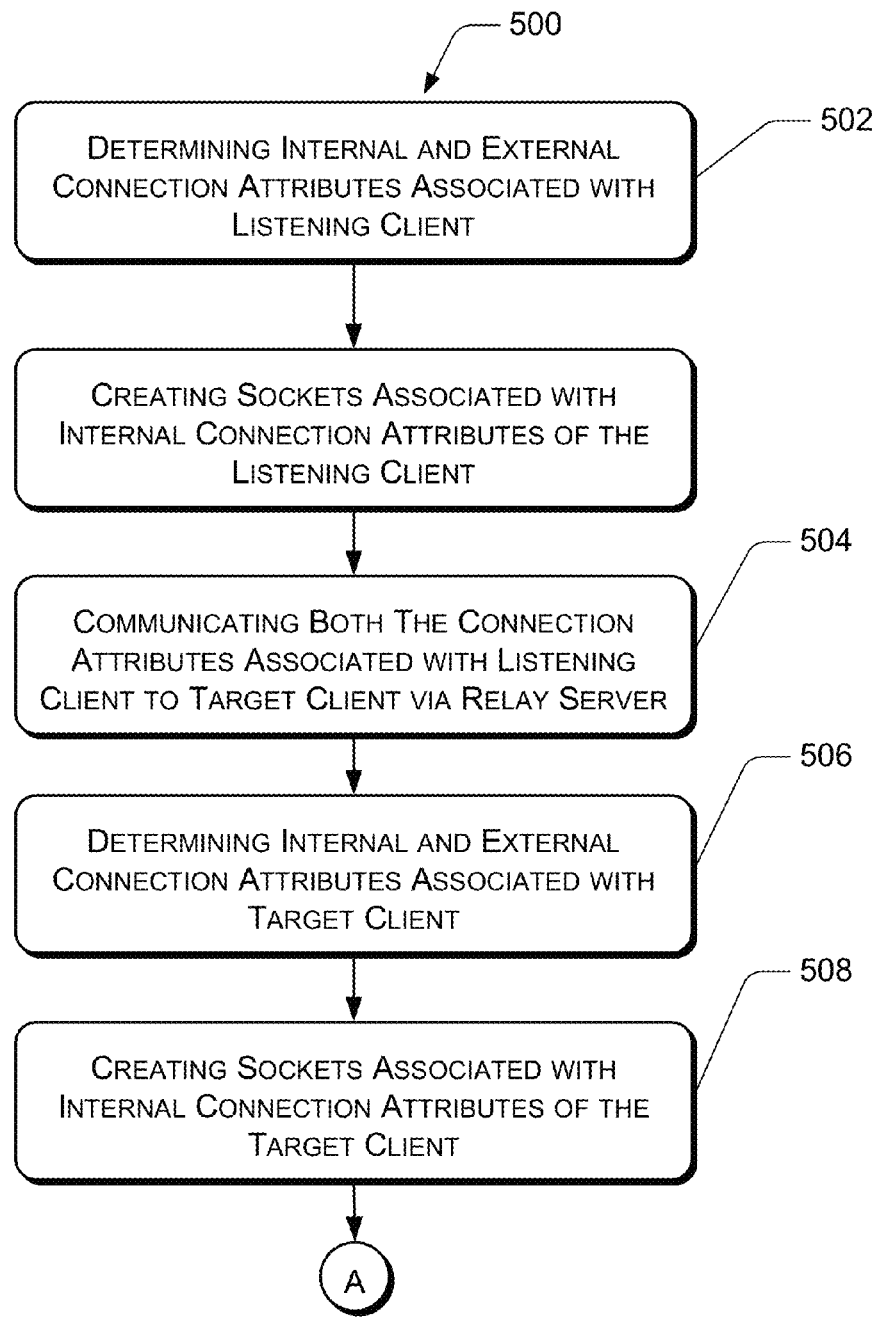
FIGS. 5 and 6 illustrate a process for implementing a NAT traversal mechanism between two restricted cone NATs.
Figure 6:
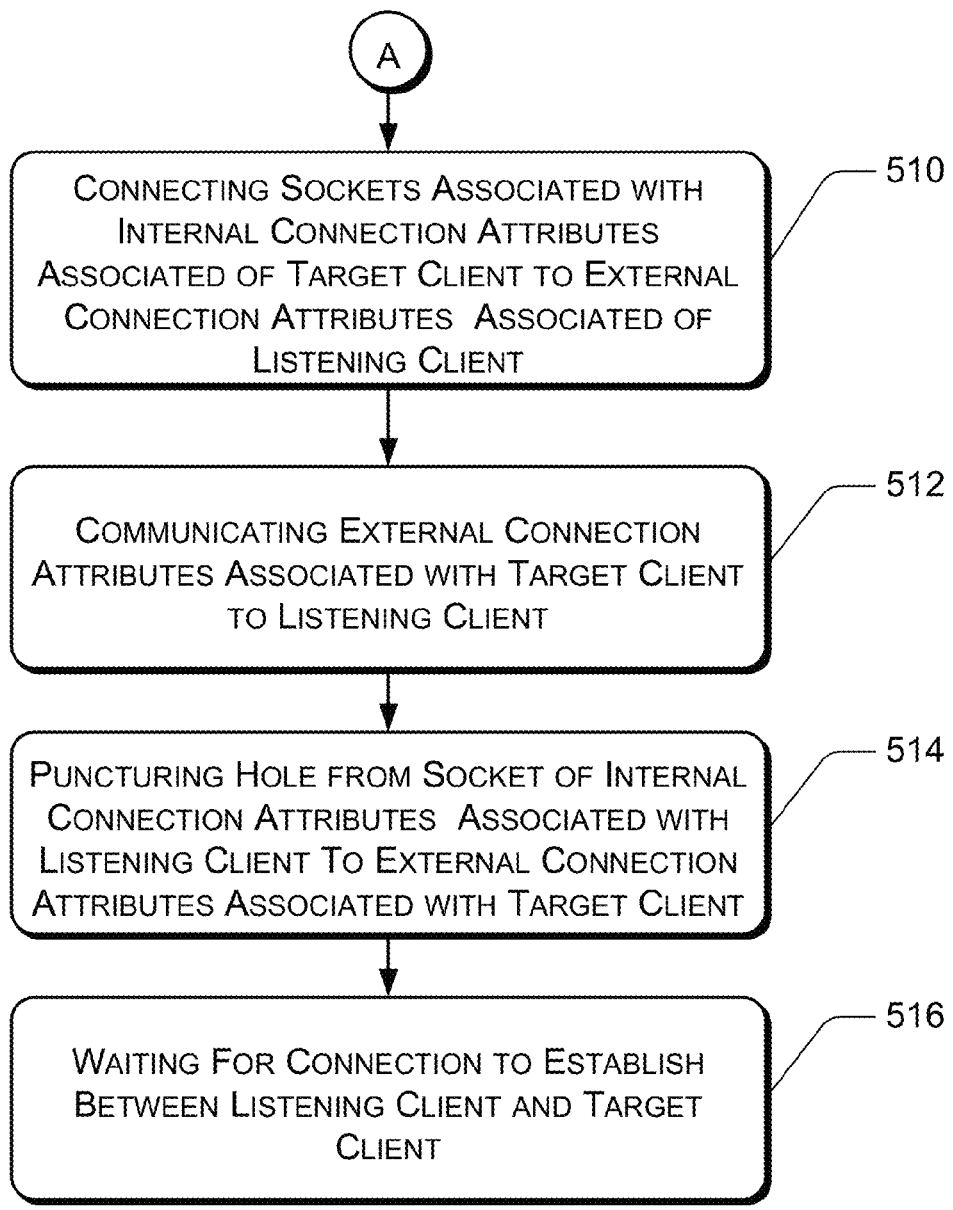

FIGS. 5 and 6 collectively illustrate an exemplary method 500 implementing a NAT traversal mechanism between two restricted cone NATs. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

In the present illustration, both of the NAT devices support restricted cone NAT types. In such a case, either of the two associated client devices can be the listening client. For the purposes of discussion only, it is assumed that client device 104(A) would be the listening device. It would be noted that such an assumption is for illustration only, and in no way is meant to limit the scope of the subject matter.

At block 502, the internal and the external connection attributes associated with the listening client are determined. For example, the client device 104(A) can use "ECHO/STUN" servers to determine the internal and external connection attributes or in an alternative implementation instructs the NAT device 106 to determine the internal and the external connection attributes. As indicated previously, a NAT device interacts with the private network through the internal connection attributes and with the public network through the external connection attributes. It would be appreciated that one or more sockets may be bound to the port and IP address of the listening client. For example, client device 104(A) can be instrumented to listen on the sockets that are bound to the port and IP address as defined by the internal connection attributes.

In an implementation, the connection attributes can be determined through an ECHO test. For example, the NAT device 106 can send some data to an ECHO server. Services running on the ECHO server are instrumented to gather both the internal and the external connection attributes associated with the NAT device that communicates with the ECHO server. The ECHO server abstracts relevant information in relation to the connection attributes of the NAT device from which it is received.

At block 504, the connection attributes of the listening client are communicated to the target client through a relay server. For example, the internal and the external port and IP address of the client device 104(A) are gathered by the port manager 210 of NAT device 106. The acquired internal and external connection attributes are communicated to the target client, say client device 104(B). The connection attributes are communicated to client device 104(B) through the relay server 102. In one implementation, the connection attributes once communicated to the client device 104(B) can be stored as port data 216 in the NAT device 108.

At block 506, the internal and the external connection attributes associated with the target client are determined. For example, the client device 104(B) determines the internal and external connection attributes using ECHO servers or in another implementation instructs the NAT device 108 to determine the internal and the external connection attributes. As indicated previously, a NAT device interacts with the private network through the internal connection attributes and with the public network through the external connection attributes. In one implementation, the port manager 210 determines the connection attributes of the NAT device 108. The connection attributes, for example port and IP addresses, can be stored as port data 216 in NAT device 108. In an implementation, the connection attributes of the target client and the associated NAT device can be determined through an ECHO test performed by the client devices 104 or in another implementation the port manager 210 of the NAT device 108.

At block 508, a socket associated with the internal connection attributes is created. For example, client device 104(B) or in another implementation the port manager 210 in the NAT device 108 creates a socket. The socket so created is bound to the internal connection attributes, say the internal port and the IP address of the NAT device 108. It would be appreciated that a socket is the logical abstraction of the port, that is linked to a specific IP address and a port. Generally a socket can be considered to be an endpoint of a two-way communication link between two programs running on a computer network. A socket can be bound to a port number.

At block 510, the socket created is connected to the external connection attributes associated with the listening client. For example, the client device 104(B) or in another implementation the connection agent 212 of the NAT device 108 connects the socket associated with its internal connection attributes to the external connection attributes of the NAT device 106. This provides a link for communicating other connection attributes of the NAT device 108 to NAT device 106.

At block 512, the external connection attributes associated with the target client is communicated to the listening client. For example, the client device 104(B) or in another implementation the connection agent 212 transmits the external connection attributes, say the relevant port and IP address, to the listening device, which is the client device 104(A) or in another implementation NAT device 106. As indicated previously, the NAT devices are characterized by internal and external connection attributes that enable the respective NAT devices to interact with a private and a public network respectively.

At this point it would be noted that the all incoming messages from the target client, namely NAT device 108, would first be intercepted by the NAT device of the listening client, namely the NAT device 106. In case of restricted cone NAT type devices, all messages received from a sending address, say a sending port and IP address, would be blocked by the NAT device at the listening client namely the NAT device 106.

In such a case, NAT device 106 would only allow such messages to pass through if a message had been previously sent through NAT device 106 to the sending address. Therefore in the instant case, the external connection attributes being communicated from the NAT device 108 would get blocked by the NAT device 106. In order to avert this condition, the listening client has to send a communication to the target client first so as to prevent the blocking of the incoming communication from it.

At block 514, the listening client aggressively transmits or punches a hole from a socket bound to the port and IP address specified by the internal connection attributes of the listening client. For example, client device 104(A) instructs the NAT device 106 to aggressively transmit a message from a socket bound to the port and IP address specified by the internal connection attributes to the port and IP address specified by the external connection attribute of NAT device 108 associated with client device 104(B). In this manner, the NAT device 106 is aware that a message or a transmission has occurred to the port and IP address associated with the NAT device 108. Thus the NAT device 106 will not block the incoming communication datagram from the external connection attributes of NAT device 108 when they are received at the NAT device 106.

At block 516, both the listening client and the target client wait for the communication link to be complete. Once the incoming communication datagram from the external connection attributes of the NAT device 108 are received by the NAT device 106, a connection can be established between client device 104(A) and client device 104(B). For example, once communication link 110 is complete, the listening client, that is the client device 104(A) and the target client, that is the client device 104(B), can communicate directly with each other. Further communication is accomplished directly between client device 104(A) and client device 104(B) without relaying any messages through the relay server 102.

Restricted Cone NAT to Symmetric NAT Traversal Logic

Figure 7:
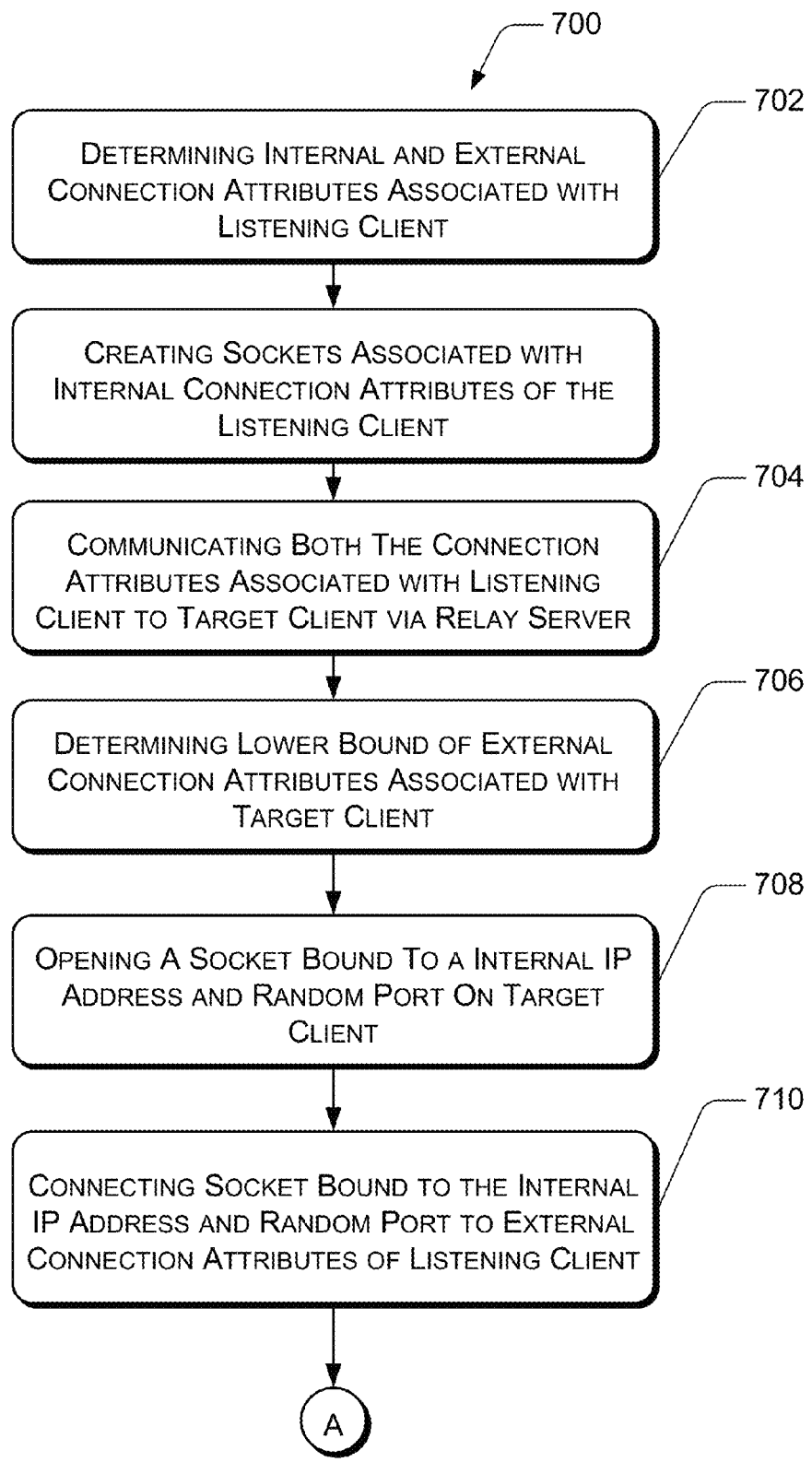
FIGS. 7 and 8 illustrate a process for implementing a NAT traversal mechanism between a restricted cone NAT and a symmetric NAT.
Figure 8:
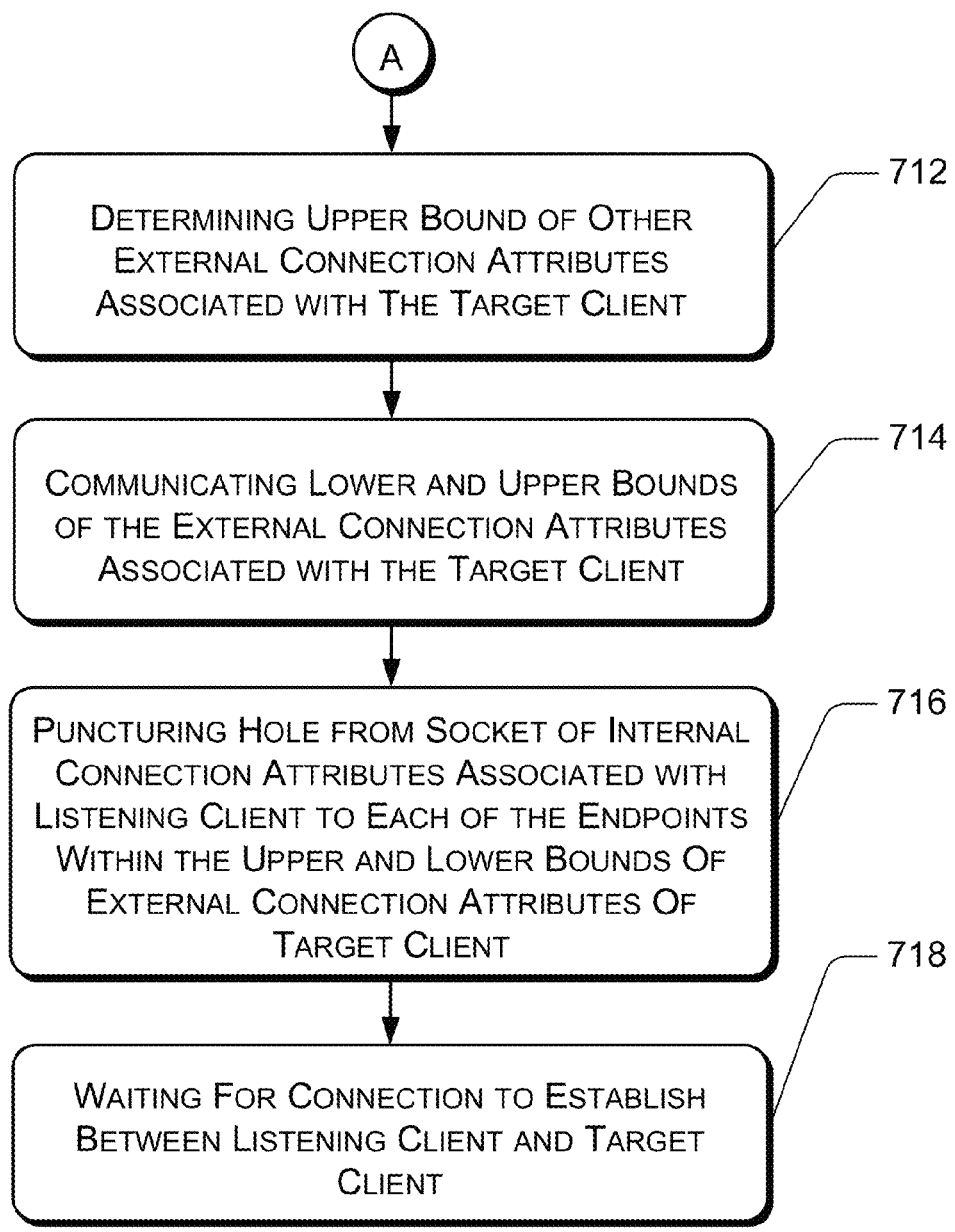

FIGS. 7 and 8 collectively illustrates an exemplary method 700 implementing a NAT traversal mechanism between a restricted cone NAT and a symmetric NAT. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

In the present case, it would be appreciated that the restricted cone NAT is less restrictive as compared to the symmetric NAT. In such a case, the NAT device implementing the restricted cone NAT would be the listening client, and the other NAT device would assume the role of a target client.

At block 702, the internal and the external connection attributes associated with the listening client are determined. For example, the client device 104(A) uses ECHO server or instructs the NAT device 106 to determine the internal and the external connection attributes. As indicated previously, a NAT device interacts with the private network through the internal connection attributes and with the public network through the external connection attributes. In one implementation, one or more sockets may be bound to the port and IP address of the listening client. In another implementation, information in relation to the internal and the external connection attributes can be stored in port data 216 in NAT device 108.

At block 704, the connection attributes of the listening client are communicated to the target client through a relay server. For example, the internal and the external port and IP address of the client device 104(A) are gathered either by the client device 104(A) using ECHO server or by the port manager 210 of NAT device 106. The acquired internal and external connection attributes are communicated to the target client, say client device 104(B). The connection attributes are communicated to client device 104(B) through the relay server 102. In one implementation, the connection attributes once communicated to the client device 104(B) can be stored as port data 216 in the NAT device 108.

At block 706, the lower bound and the upper bound of the external connection attributes associated with the target client are determined. For example, the client device 104(B) instructs the NAT device 108 to determine the lower bound of the external connection attributes, say through an ECHO test. It would be appreciated that the NAT type in the instant case is a symmetric NAT. Symmetric NAT when sending a message from a specific internal connection attribute will open a different external attributes whenever it wishes to transmit a message to a different destination port and IP address. Hence the external port is different for messages sent to a specific destination address, say a specific IP address and port.

Typically in most symmetric NATs, the external connection attributes vary linearly with each transmission. For example, if the external port for a given message transmission is "7000", then for a subsequent transmission to a different IP address, the port number would increase in a linear manner, for example "7001". Estimations may be made as to the lower bound and the upper bound of the connection attributes, where the lower bound is the connection attribute through which the first transmission takes place. Since the manner in which the port number varies can be linear, the upper bound would be the last port number that would be allotted for a particular series of interactions with the symmetric NAT device.

In an implementation, the port manager 210 determines the connection attributes of the NAT device 108. The connection attributes, for example port and IP addresses, can be stored as port data 216 in NAT device 108. In another implementation, the connection attributes of the target client and the associated NAT device can be determined through an ECHO test performed by the port manager 210 of the NAT device 108.

At block 708, a socket is opened and is bound to an internal IP address and a random port. The socket is bound to an internal IP address and random port because any sending of messages from the target client will open a different external connection attribute. For example, client device 104(B) can instruct the port manager 210 in NAT device 108 to open a socket bound to an internal IP address and random port, for example X:0. It would be noted that at this stage, it is not necessary to ascertain the internal connection attributes of the NAT device 108.

At block 710, the socket bound to the internalIP address and random port is connected to the external connection attributes of the listening client. For example, the client device 104(B) can instruct the connection agent 212 of the NAT device 108 to establish a connection between the socket bound to the internal IP address and random port, and the external connection attributes of the NAT device 106.

At block 712, the upper bound of the external connection attributes of the target client are determined. For example, the client device 104(B) instructs the NAT device 108 to determine the upper bound of the external connection attributes. As indicated previously, during a series of transaction, the external port that is opened at the transmitted end is always different in case of a symmetric NAT. For example, the ports that are opened at the other end would vary linearly. Hence a lower bound of the external connection attribute would typically be for the first of the series of transmission and the upper bound would be the connection attribute for the last of such series of transactions. In one implementation, the upper bound of the external connection attributes can be determined through an ECHO test.

At block 714, the lower and the upper bounds of the external connection attributes of the target client are communicated to the listening client. For example, the client device 104(B) can instruct the NAT device 108 to forward the upper and the lower bound of the external connection attributes to the NAT device 106, client device 104(A). At this point, it would be noted that the communication is intended for a NAT device that is implementing a restricted cone NAT. In such a case, any communication intended to be received by the restricted cone NAT device would be blocked if no prior communication has been from the restricted cone NAT device. In order to avoid such occurrences, the restricted cone NAT device has to send a communication to the address from which the message may be sent. Additionally, in case of symmetric NAT, the external connection attribute, say an external port, that is opened is different for each communication. However, a range of possible external connection attributes is known.

At block 716, the listening device "punctures a hole" from a socket bound to the internal connection attributes to each of the connection attributes falling within the range between the lower and the upper attributes. For example, client device 104(A) instructs the NAT device 106 to transmit a message or punch a hole from a socket bound to each of the external connection attributes of NAT device 108, that are included within the range of the upper and the lower bound of the connection attributes. Since the external connection attributes cannot be definitely known, the client device 104(A) punctures a hole to each of the connection attributes specified within the upper and the lower connection attributes of the NAT device 108.

At block 718, both the listening client and the target client wait for the communication link to be complete. Out of the many external connection attributes specified within the upper and the lower bound, once a connection is established for any one of them, then further communication will proceed only through that specific connection attribute. For example, connection agent 212 can establish a communication link 110 on the basis of any one of the external connection attributes in the upper and the lower bounds. Once communication link 110 is complete, the listening client (e.g., client device 104(A)) and the target client (e.g., client device 104(B)), can communicate directly with each other. Further communication is accomplished directly between client device 104(A) and client device 104(B) without relaying any messages through the relay server 102.

Restricted Cone NAT to ISA Traversal Logic

Figure 9:
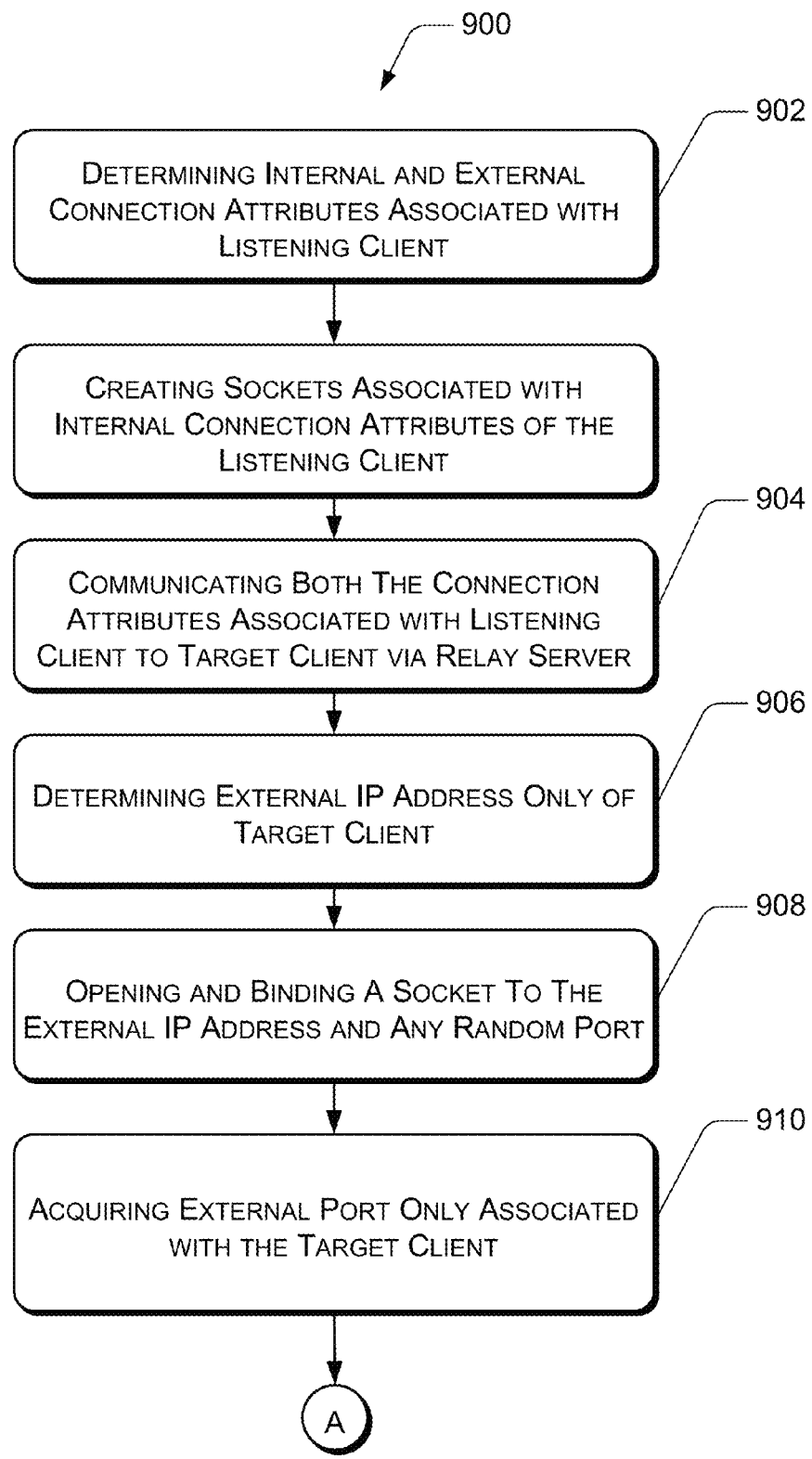
FIGS. 9 and 10 illustrate a process for implementing a NAT traversal mechanism between a restricted cone NAT and an ISA Proxy.
Figure 10:
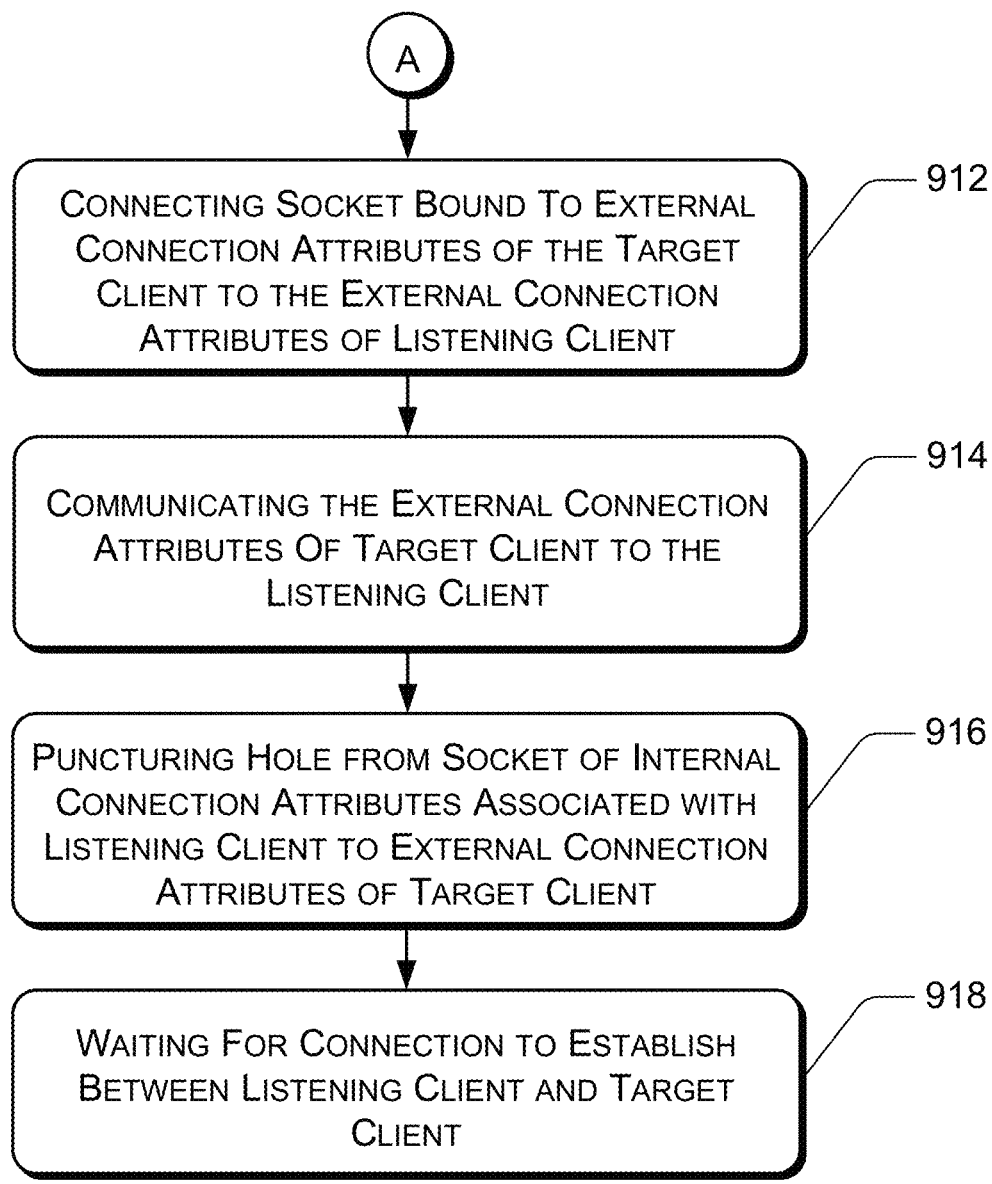

FIGS. 9 and 10 collectively illustrates an exemplary method 900 implementing a NAT traversal mechanism between a restricted cone NAT and an ISA Proxy. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 902, the internal and the external connection attributes associated with the listening client are determined. For example, the client device 104(A) instructs the NAT device 106 to determine the internal and the external connection attributes. As discussed above, a NAT device interacts with the private network through the internal connection attributes and with the public network through the external connection attributes. In an implementation, one or more sockets may be bound to the port and IP address of the listening client. In another implementation, information in relation to the internal and the external connection attributes can be stored in port data 216 in NAT device 108.

At block 904, the connection attributes of the listening client are communicated to the target client through a relay server. For example, the internal and the external port and IP address of the client device 104(A) are gathered by the port manager 210 of NAT device 106. The acquired internal and external connection attributes are communicated to the target client, for example client device 104(B) through the relay server 102. In an implementation, the connection attributes once communicated to the client device 104(B) can be stored as port data 216 in the NAT device 108.

At block 906, the external IP address of the target client can be determined. For example, the NAT device 108 can be instrumented to determine the external IP address associated with it. As indicated previously, each of the NAT devices 106, 108 can be characterized by internal and external connection attributes, for example, a port and an IP address. In an implementation, port manager 210 in NAT device 108 can determine the external IP address associated with the NAT device 108. In another implementation, the external IP address can be determined through an ECHO test.

At block 908, a socket can be opened and bound to the external IP address of the target client and a random port. For example, the NAT device 108, and in particularly the port manager 210, can open a socket and bind the socket to external connection attributes. The connection attributes include the external IP address of the target client and a random port (e.g., port 0). In this way, the external IP address can be associated with a port number. This process of port reservation insures that the external IP address is always associated with a specific port number.

At block 910, the external port number of the target client is determined. For example, the port manager 210 can determine the port number of the NAT device 108. In an implementation, port manager 210 can execute an application or a service to obtain the external port number. Examples of such applications include one or more of the WINSOCK API, getsockname ( ), and such. Execution of such applications results in the determination of the external port number. In another implementation, the external port number so obtained can be stored in port data 216 in NAT device 108. At this stage, the NAT device 108 can be identified through both the external IP address and the external port number.

At block 912, the target client establishes a connection between its external connection attributes and the external connection attributes of the listening client. For example, the connection agent 212 of NAT device 108 picks up the external connection attributes of the client device 104(A) from port data 216 and establishes a connection between itself and the listening client, namely the client device 104(A).

At block 914, the target client communicates the external connection attributes to the listening client. For example, the client device 104(B) can instruct the NAT device 108 to forward the external connection attributes of NAT device 108 to the NAT device 106, client device 104(A).

At this point it is to be noted that the communication is intended for a NAT device that is implementing a restricted cone NAT. In such a case, any communication intended to be received by the restricted cone NAT device would be blocked if no prior communication has been from the restricted cone NAT device. In order to avoid such occurrences, the restricted cone NAT device sends a communication to the address from which the message may be sent.

At block 916, the listening device punctures a hole from a socket bound to the internal connection attributes to the external connection attributes of the target client. For example, client device 104(A) instructs the NAT device 106 to transmit a message or punch a hole from internal connection attribute of NAT device 106 to the external connection attributes of NAT device 108. In this manner, a previous communication is accomplished before the NAT device 106 receives any further communication from the NAT device 108. In such a case, the external connection attributes of the NAT device 108 could not be blocked by the NAT device 106, as a previous communication from the source of the external connection attributes has already occurred.

At block 918, both the listening client and the target client wait for the communication link to be complete. Once the external connection attributes of the NAT device 108 are received by the NAT device 106, a connection can be established between client device 104(A) and client device 104(B). For example, once communication link 110 is complete, the listening client, that is the client device 104(A) and the target client, that is the client device 104(B), can communicate directly with each other. Further communication is accomplished directly between client device 104(A) and client device 104(B) without relaying any messages through the relay server 102.

Symmetric NAT to Symmetric NAT Traversal Logic

Figure 11:
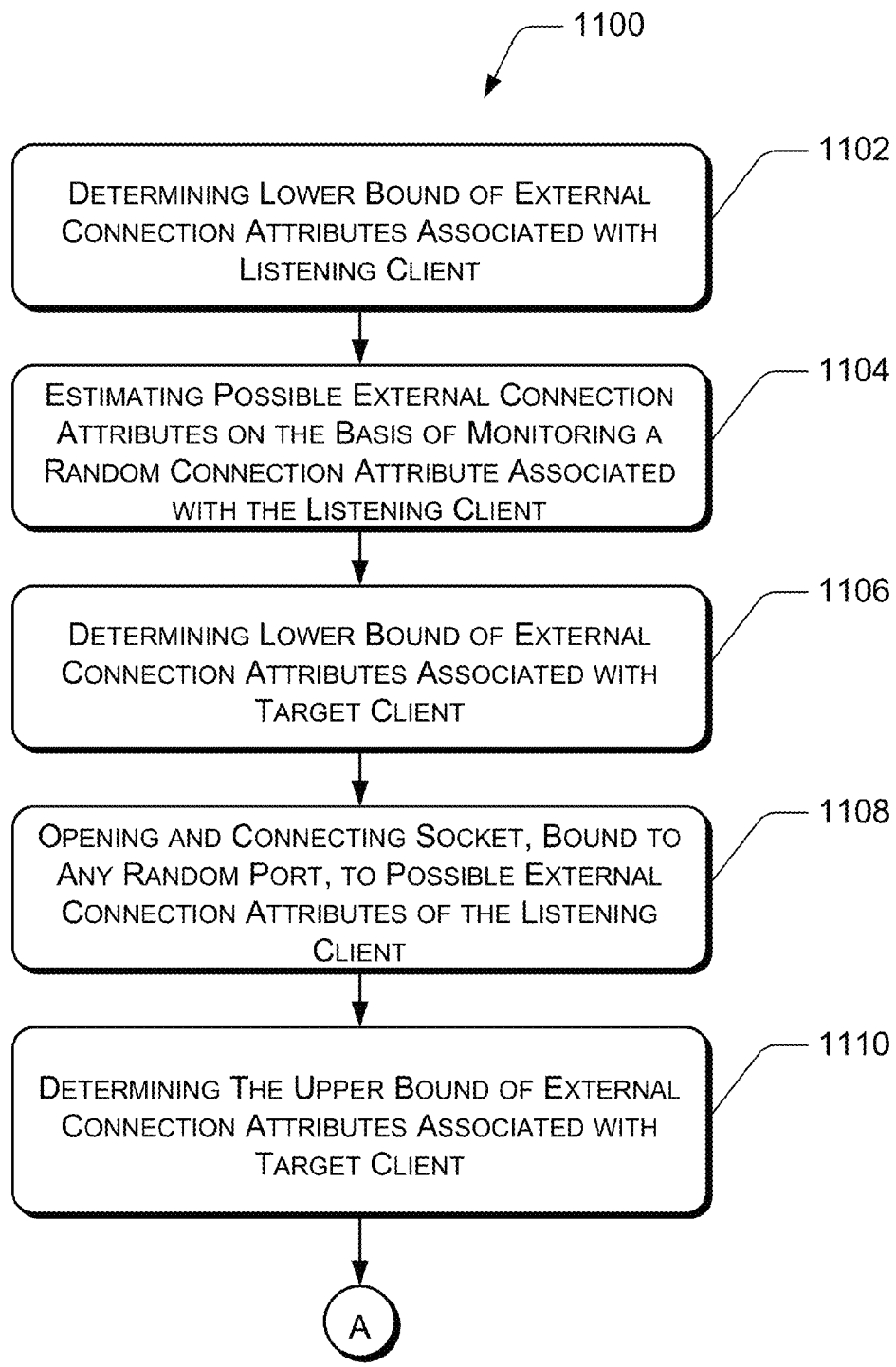
FIGS. 11 and 12 illustrate a process for implementing a NAT traversal mechanism between two symmetric NAT devices.
Figure 12:
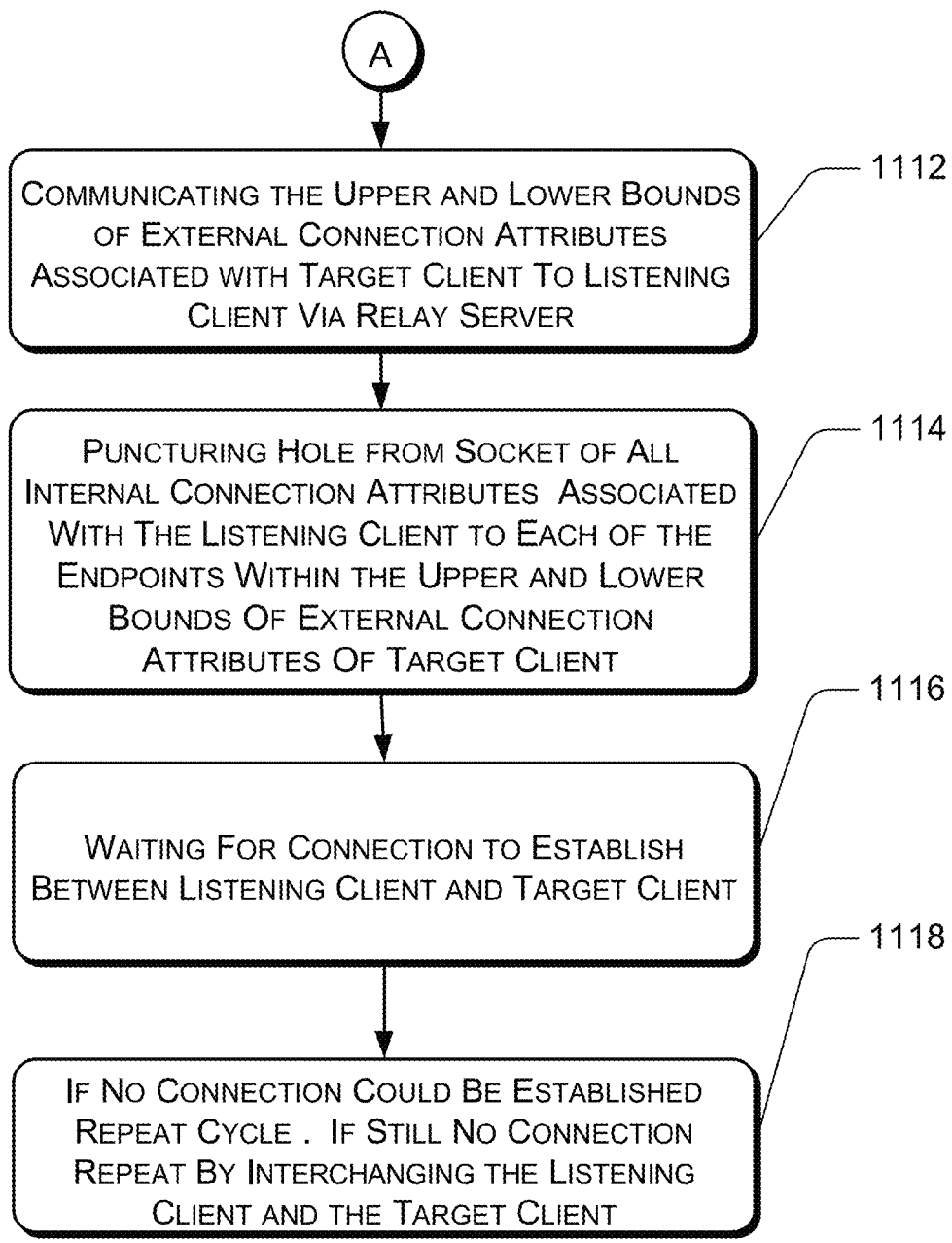

FIGS. 11 and 12 collectively illustrates an exemplary method 1100 implementing a NAT traversal mechanism between two symmetric NAT devices. In this case, since both of the NAT devices implement symmetric NAT, any of the two devices can be a listening client. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1102, the lower bound of the external connection attributes associated with the listening client are determined. For example, the client device 104(A) instructs the NAT device 106 to determine the lower bound of the external connection attributes. Symmetric NAT devices when sending a message from a specific internal connection attribute will open a different external attributes for different destination addresses whenever it wishes to transmit a message. Hence the external port is different for a message sent to a specific destination address, say a specific IP address.

At block 1104, possible external connection attributes of the listening client can be estimated. This can be done by sending a ECHO request from the client device 104(A) to the ECHO server. The ECHO server returns the external address and port of the NAT device. To predict the external port in our implementation we add a random number between 1 and 10 to the external port returned by the ECHO server. In case of symmetric type NATs, the external port number that is opened for sending a message is different if the destination address is different. In some cases, the symmetric NAT devices can be instrumented such that the external port number can vary linearly when a series of such transmissions take place.

In one implementation, the port manager 210 can estimate the external port number to lie within a specified range, for example for a port F, number of possible external port numbers estimated can be F+m. The value of the entity m can be small. A high numeric value of m would be indicative of the fact that the NAT device under consideration is exposed to high data traffic. The possible external connection attributes of the listening client, which is the client device 104(A) is communicated to the target client, which is client device 104(B).

At block 1106, the lower bound of the external connection attributes associated with the target client are determined. For example, the client device 104(B) can instruct the NAT device 108 to determine the lower bound of the external connection attributes. In one implementation, the lower bound of the external connection attributes can be determined through an ECHO test as indicated previously.

At block 1108, a socket is created. The created socket is bound to the random port and internal IP address NAT device 108 associated with client device 104(B) The created socket is then connected to the possible external connection attributes associated with the listening client. For example, the port manager 210 of NAT device 108 can open and connect the socket to the predicted external connection attributes, say IP address E and port F+m where 1<m<10, of the NAT device 106. The socket is bound to the random port and the IP address.

At block 1110, the upper bound of the external connection attributes associated with the target client can be determined. For example, the client device 104(B) instructs the NAT device 108 to determine the upper bound of the external connection attributes. As indicated previously, during a series of transaction, the external port that is opened at the transmitted end is different in case of a symmetric NAT if the destination address is different. In one implementation, the upper bound of the external connection attributes can be determined through an ECHO test.

At block 1112, the lower and the upper bounds of the external connection attributes of the target client are communicated to the listening client. For example, the client device 104(B) can instruct the NAT device 108 to forward the upper and the lower bound of the external connection attributes to the NAT device 106, client device 104(A).

At block 1114, the listening device punctures a hole to all the external connection attributes between the upper and the lower bound, from a new socket bound to the internal connection attributes of the listening client. For example, client device 104(A) instructs the NAT device 106 to puncture a hole from a new socket bound to the internal connection attributes of NAT device 106 to all of the external connection attributes of NAT device 108 within the lower and upper bound. The socket is punctured through to the entire external connection attribute of the target device. The external connection attributes lies within the range specified by the upper and the lower bounds of the external connection attributes of the NAT device 108.

At block 1116, both the listening client and the target client wait for the communication link to be complete. Once the external connection attributes of the NAT device 108 are received by the NAT device 106, a connection can be established between client device 104(A) and client device 104(B). For example, once communication link 110 is complete, the listening client, that is the client device 104(A) and the target client, that is the client device 104(B), can communicate directly with each other. Further communication is accomplished directly between client device 104(A) and client device 104(B) without relaying any messages through the relay server 102.

At block 1118, if no connection can be established then the entire process cycle can be repeated again. In one implementation, the process cycle can be repeated a certain number of time before a connection can be established. If still a connection fails to get established, the listening client and the target client can be interchanged. For example, client device 104(A) can be the target client and client device 104(B) can be the listening client.

Symmetric NAT to ISA Traversal Logic

Figure 13:
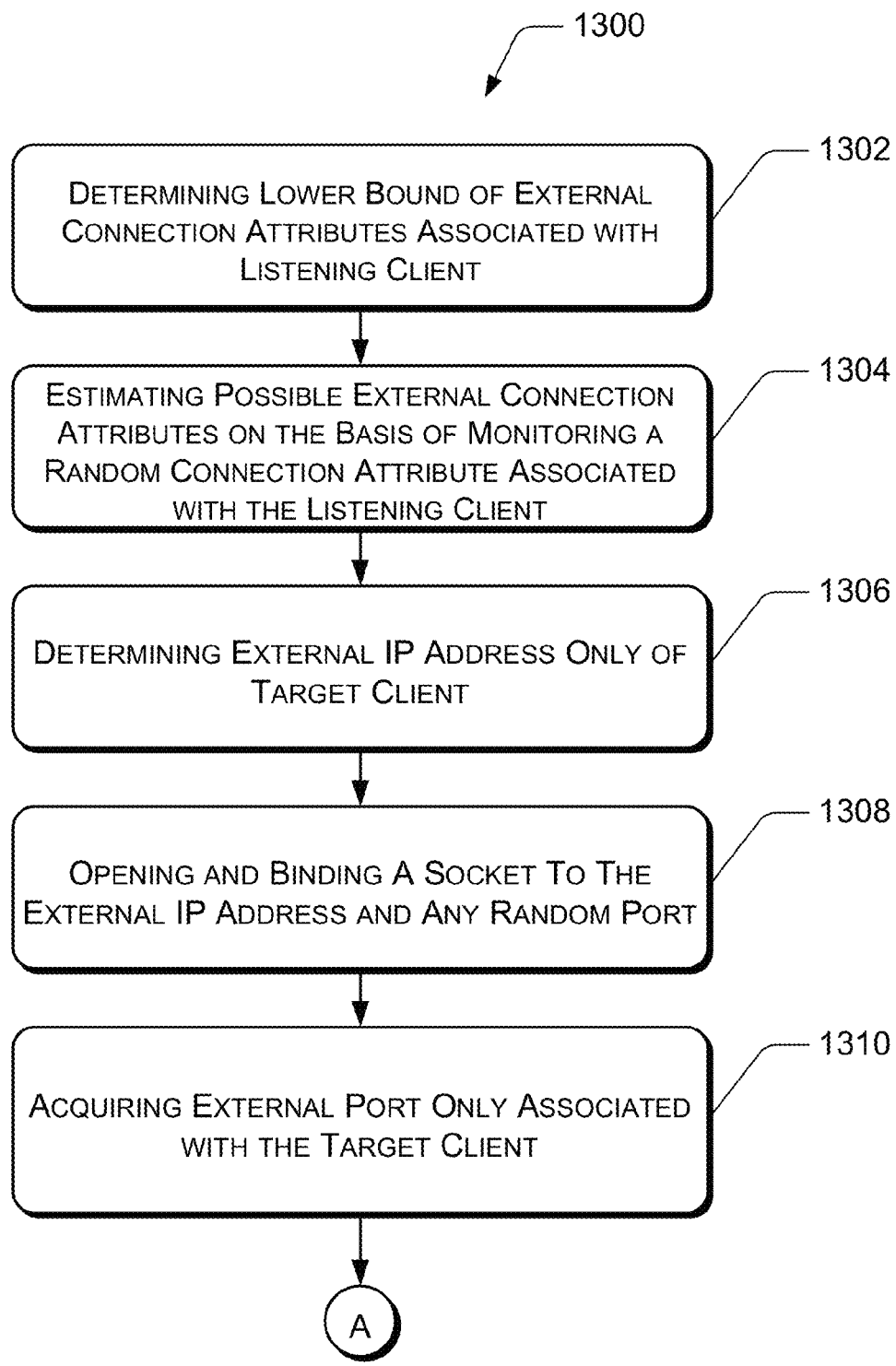
FIGS. 13 and 14 illustrate a process for implementing a NAT traversal mechanism between a symmetric NAT device and a NAT device implemented through ISA proxy.
Figure 14:
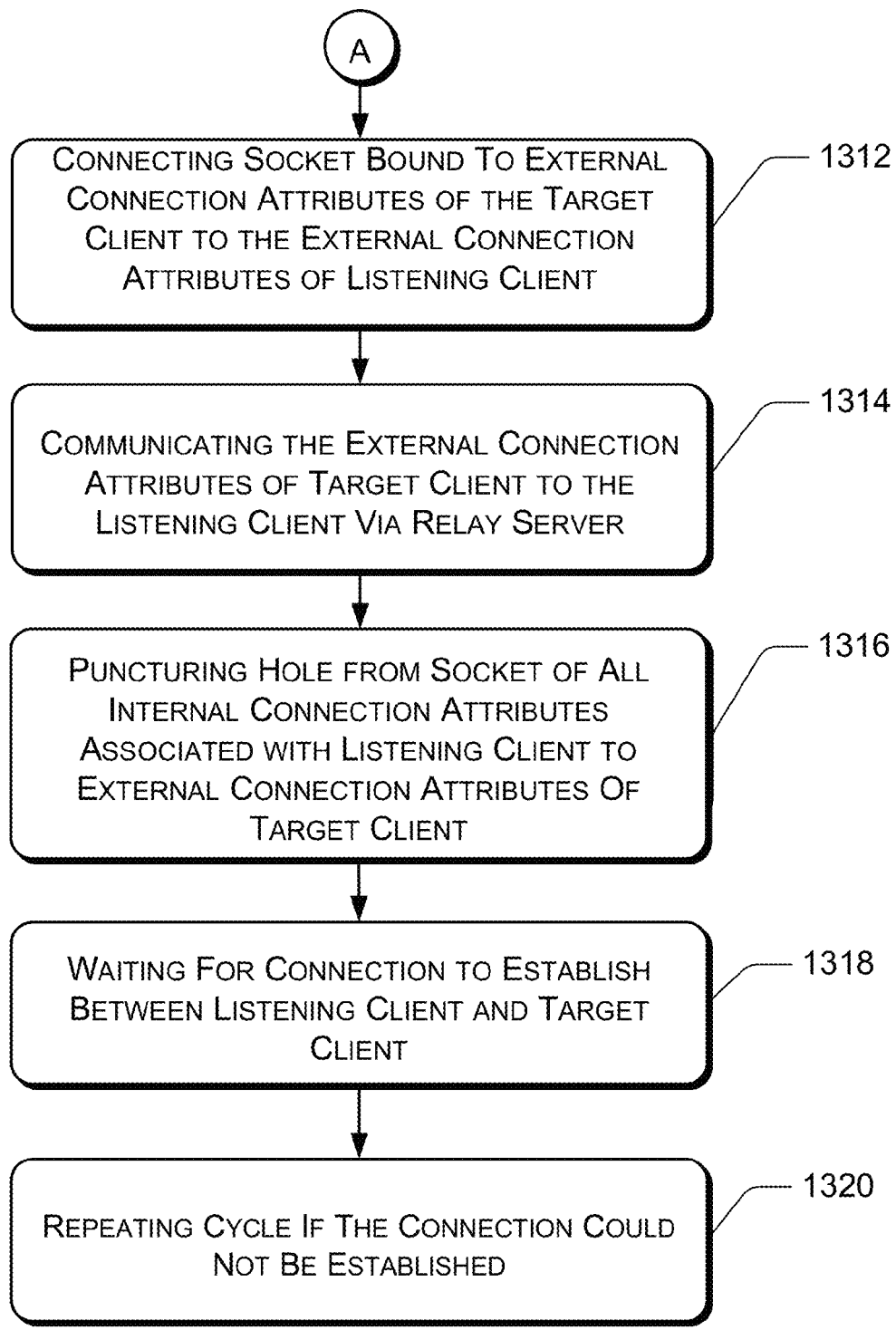

FIGS. 13 and 14 collectively illustrates an exemplary method 1300 implementing a NAT traversal mechanism between a symmetric NAT device and a NAT device implemented through ISA proxy. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1302, the lower bound of the external connection attributes associated with the listening client are determined.

For example, the client device 104(A) uses an ECHO server to determine the lower bound or in another implementation instructs the NAT device 106 to determine the lower bound of the external connection attributes. Typically, symmetric NAT devices when sending a message from a specific internal connection attribute will open a different external attributes for different destination addresses whenever it wishes to transmit a message.

At block 1304, possible external connection attributes of the listening client can be estimated. The ECHO server returns the external address and port of the NAT device. To predict the external port in our implementation we add a random number between 1 and 10 to the lower bound external port returned by the ECHO server. In one implementation, the port manager 210 can estimate the external port numbers as a range, for example for a port F, number of possible external port numbers estimated can be F+m. The value of the entity m can be small as high numeric value of m would indicate high data traffic. The possible external connection attributes of the listening client, which is the client device 104(A) is communicated to the target client, which is client device 104(B).

At block 1306, the external IP address of the target client can be determined. For example, the NAT device 108 can be instrumented to determine the external IP address associated with it. In one implementation, port manager 210 in NAT device 108 can determine the external IP address associated with the NAT device 108, say through an ECHO test.

At block 1308, a socket can be opened and bound to the external IP address of the target client and any random port. For example, the NAT device 108, more particularly, the port manager 210 can open a socket and bind the socket to external communication attributes. The communication attributes include the external IP address of the target client and any random port, say port 0. In this way, the external IP address is always associated with a specific port number.

At block 1310, the external port number of the target client is determined. For example, the port manager 210 can determine the port number of the NAT device 108. In one implementation, port manager 210 can execute an application or a service to obtain the external port number. Examples of such applications include one or more of the WINSOCK API, getsockname( ), and such. In another implementation, the external port number so obtained can be stored in port data 216 in NAT device 108. At this stage, the NAT device 108 can be identified through both the external IP address and the external port number.

At block 1312, the target client establishes a connection between its external connection attributes and the external connection attributes of the listening client. For example, the connection agent 212 of NAT device 108 picks up the external connection attributes of the client device 104(A) from port data 216 and establishes a connection between itself and the listening client, namely the client device 104(A).

At block 1314, the target client communicates the external connection attributes to the listening client. For example, the client device 104(B) can instruct the NAT device 108 to forward the external connection attributes of NAT device 108 to the NAT device 106 and/or client device 104(A).

At block 1316, the listening device punctures a hole to the external connection attributes of the target client, from a new socket bound to the internal connection attributes of the listening client. For example, client device 104(A) instructs the NAT device 106 to puncture a hole from all the internal connection attributes in the range of lower and upper bound, to connection attributes of NAT device 108. The socket is punctured through to the external connection attribute of the NAT device 108.

At block 1318, both the listening client and the target client wait for the communication link to be complete. Once the external connection attributes of the NAT device 108 are received by the NAT device 106, a connection can be established between client device 104(A) and client device 104(B). For example, once communication link 110 is complete, the listening client (e.g., client device 104(A)), and the target client (e.g., client device 104(B)), can communicate directly with each other.

At block 1320, if no connection can be established then the entire process cycle can be repeated. In one implementation, the process cycle can be repeated a certain number of times before a connection can be established.

ISA to ISA Traversal Logic

Figure 15:
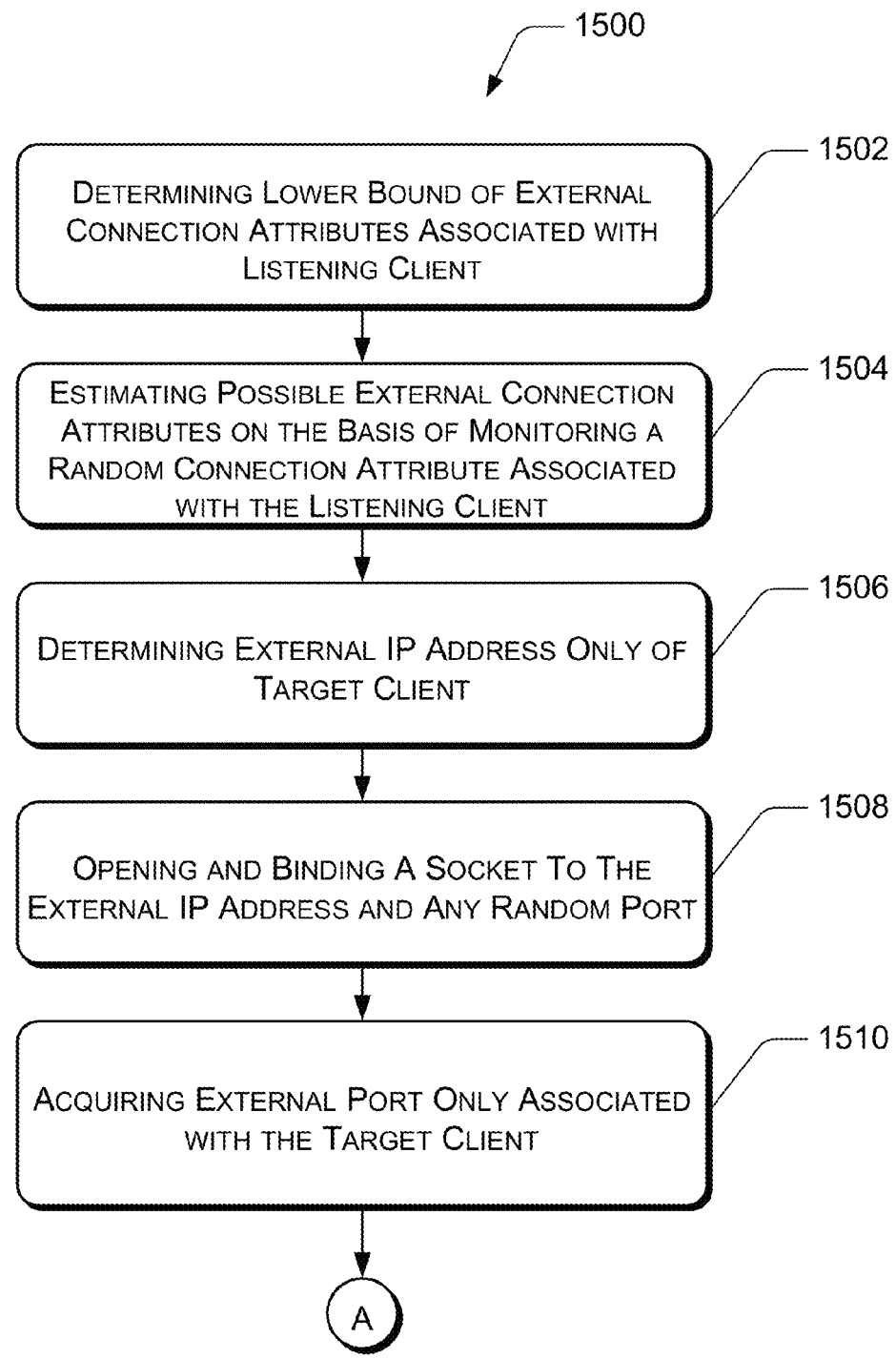
FIGS. 15 and 16 illustrates a process of implementing a NAT traversal mechanism between two ISA proxy NAT devices.
illustrates exemplary NAT traversal processes.
Figure 16:
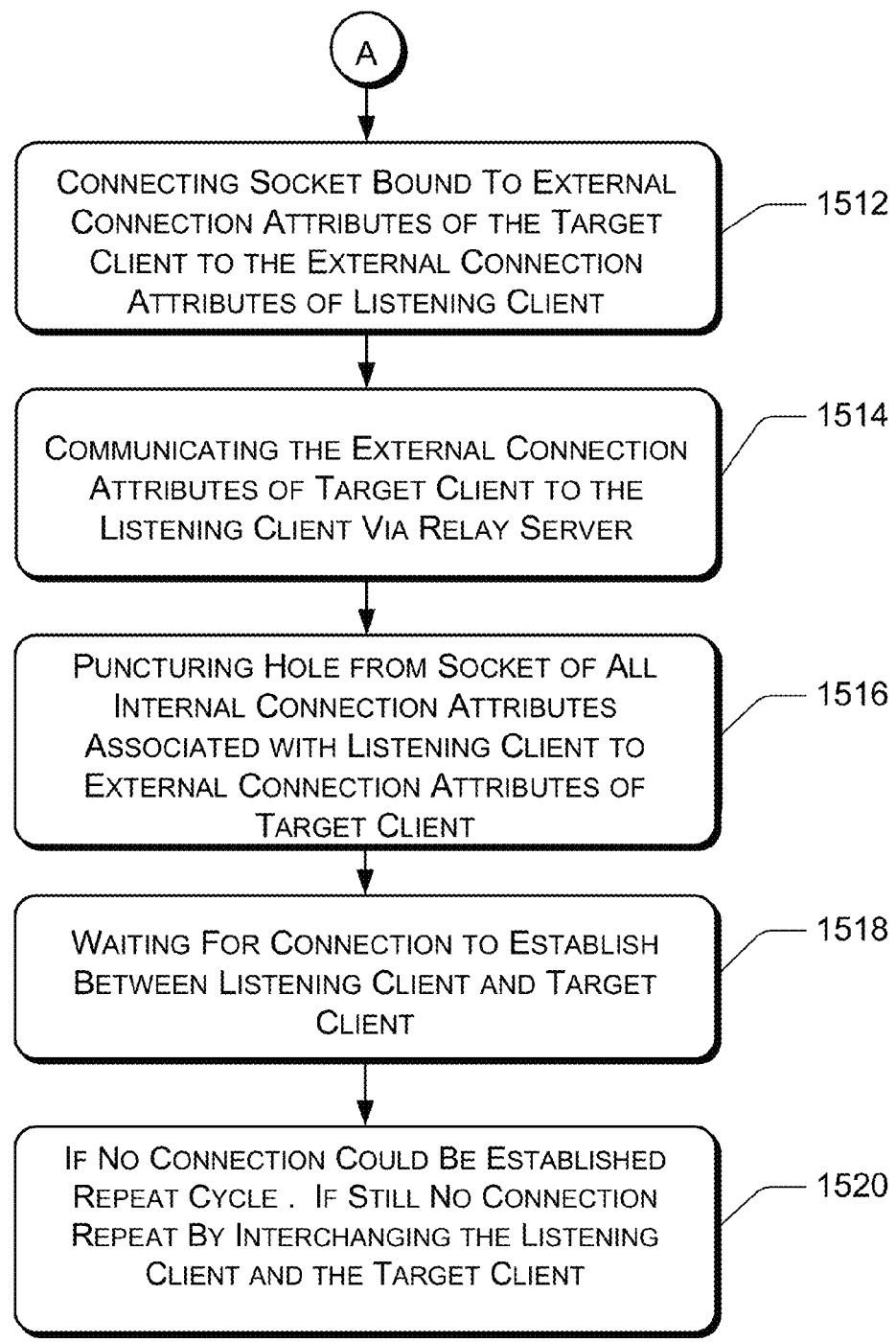

FIGS. 15 and 16 collectively illustrates an exemplary method 1500 implementing a NAT traversal mechanism between two NAT devices implemented through ISA proxy. Since both the devices are equally restrictive, either of them could be listening client or a target client. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1502, the lower bound of the external connection attributes associated with the listening client are determined. For example, the client device 104(A) uses an ECHO server to determine the lower bound or in another implementation instructs the NAT device 106 to determine the lower bound of the external connection attributes. Typically, symmetric NAT devices when sending a message from a specific internal connection attribute will open a different external attributes for different destination addresses whenever it wishes to transmit a message.

At block 1504, possible external connection attributes of the listening client can be estimated. The ECHO server returns the external address and port of the NAT device. To predict the external port in our implementation we add a random number between 1 and 10 to the lower bound external port returned by the ECHO server. In one implementation, the port manager 210 can estimate the external port numbers as a range, for example for a port F, number of possible external port numbers estimated can be F+m. The value of the entity m can be small as high numeric value of m would indicate high data traffic. The possible external connection attributes of the listening client, which is the client device 104(A) is communicated to the target client, which is client device 104(B).

At block 1506, the external IP address of the target client can be determined. For example, the NAT device 108 can be instrumented to determine the external IP address associated with it. In one implementation, port manager 210 in NAT device 108 can determine the external IP address associated with the NAT device 108, say through an ECHO test.

At block 1508, a socket can be opened and bound to the external IP address of the target client and any random port. For example, the NAT device 108, more particularly, the port manager 210 can open a socket and bind the socket to external communication attributes. The communication attributes include the external IP address of the target client and any random port, say port 0. In this way, the external IP address is always associated with a specific port number.

At block 1510, the external port number of the target client is determined. For example, the port manager 210 can determine the port number of the NAT device 108. In one implementation, port manager 210 can execute an application or a service to obtain the external port number. Examples of such applications include one or more of the WINSOCK API, getsockname( ), and such. In another implementation, the external port number so obtained can be stored in port data 216 in NAT device 108. At this stage, the NAT device 108 can be identified through both the external IP address and the external port number.

At block 1512, the target client establishes a connection between its external connection attributes and the external connection attributes of the listening client. For example, the connection agent 212 of NAT device 108 picks up the external connection attributes of the client device 104(A) from port data 216 and establishes a connection between itself and the listening client, namely the client device 104(A).

At block 1514, the target client communicates the external connection attributes to the listening client. For example, the client device 104(B) can instruct the NAT device 108 to forward the external connection attributes of NAT device 108 to the NAT device 106 and/or client device 104(A).

At block 1516, the listening device punctures a hole to the external connection attributes of the target client, from a new socket bound to the internal connection attributes of the listening client. For example, client device 104(A) instructs the NAT device 106 to puncture a hole from all the internal connection attributes in the range of lower and upper bound, to connection attributes of NAT device 108. The socket is punctured through to the external connection attribute of the NAT device 108.

At block 1518, both the listening client and the target client wait for the communication link to be complete. Once the external connection attributes of the NAT device 108 are received by the NAT device 106, a connection can be established between client device 104(A) and client device 104(B). For example, once communication link 110 is complete, the listening client (e.g., client device 104(A)), and the target client (e.g., client device 104(B)), can communicate directly with each other.

At block 1520, if no connection can be established then the entire process cycle can be repeated. If connection still cannot be established, then the cycle may be repeated by interchanging the listening client and the target client.

CONCLUSION

Although embodiments for implementing various NAT traversals have been described in language specific to structural features and/or methods, it is to be understood that the subject of the appended claims is not necessarily limited to the specific features or methods described. Rather, the specific features and methods are disclosed as exemplary implementations for providing one or more NAT traversal techniques.

What is claimed is:

1. A symmetric network address translation (NAT) device comprising:
    a processor;
    memory communicatively coupled to the processor;
    a port manager stored in the memory and executable by the processor that determines a lower bound and an upper bound of external connection attributes associated with a first device in response to receiving a request for connection with the first device from a second device and obtains a range that specifies external port numbers of the first device out of which a socket with the first device is to be connected, wherein the lower bound is a connection attribute through which a first transmission of a series of transmissions takes place and the upper bound is a connection attribute allotted for a last transmission of the series of transmissions, and wherein the range is obtained by adding a random number that indicates an amount of data traffic associated with the first device and the random number is larger for a higher data traffic associated with the first device; and
    a connection agent stored in the memory and executable by the processor that establishes a connection between the first device and the second device based on the determined lower bound and the determined upper bound.

2. The symmetric NAT device as recited in claim 1, further comprising port data, the port data enabling identification of port addresses for the symmetric NAT device.

3. The symmetric NAT device as recited in claim 1, wherein the port manager determines the lower bound and the upper bound of the external connection attributes through an ECHO test.

4. The symmetric NAT device as recited in claim 1, wherein the port manager is further configured to open the socket and bind the socket to internal connection attributes of the first device.

5. The symmetric NAT device as recited in claim 4, wherein the internal connection attributes of the first device include an internal IP address and a random port associated with the first device.

6. The symmetric NAT device as recited in claim 1, wherein the NAT device is configured to communicate the lower bound and the upper bound of the external connection attributes associated with the first device to the second device.

7. The symmetric NAT device as recited in claim 1, wherein the connection agent establishes the connection through a port of the symmetric NAT device.

8. A method comprising:
    determining a lower bound and an upper bound of external connection attributes associated with a first device in response to receiving a request for connection with the first device from a second device, the lower bound being a connection attribute through which a first transmission of a series of transmissions takes place and the upper bound being a connection attribute allotted for a last transmission of the series of transmissions;
    obtaining a range that specifies external port numbers of the first device out of which a socket with the first device is to be connected, the range being obtained by adding a random number that indicates an amount of data traffic associated with the first device and the random number being larger for a higher data traffic associated with the first device; and
    establishing a connection between the first device and the second device based on the determined lower bound and the determined upper bound.

9. The method as recited in claim 8, further comprising identifying port addresses for a symmetric NAT device based on port data.

10. The method as recited in claim 8, wherein determining the lower bound and the upper bound of the external connection attributes is performed through an ECHO test.

11. The method as recited in claim 8, further comprising opening the socket and binding the socket to internal connection attributes of the first device.

12. The method as recited in claim 11, wherein the internal connection attributes of the first device include an internal IP address and a random port associated with the first device.

13. The method as recited in claim 8, further comprising communicating the lower bound and the upper bound of the external connection attributes associated with the first device to the second device.

14. The method as recited in claim 8, wherein establishing the connection comprises establishing the connection through a port of a symmetric NAT device.

15. One or more memory storage devices storing executable instructions that, when executed by one or more processors, cause the one or more processors to perform acts comprising:

determining a lower bound and an upper bound of external connection attributes associated with a first device in response to receiving a request for connection with the first device from a second device, the lower bound being a connection attribute through which a first transmission of a series of transmissions takes place and the upper bound being a connection attribute allotted for a last transmission of the series of transmissions;

obtaining a range that specifies external port numbers of the first device out of which a socket with the first device is to be connected, the range being obtained by adding a random number that indicates an amount of data traffic associated with the first device and the random number being larger for a higher data traffic associated with the first device; and establishing a connection between the first device and the second device based on the determined lower bound and the determined upper bound.

16. The one or more memory storage devices as recited in claim 15, wherein determining the lower bound and the upper bound of the external connection attributes is performed through an ECHO test.

17. The one or more memory storage devices as recited in claim 15, the acts further comprising opening the socket and binding the socket to internal connection attributes of the first device.

18. The one or more memory storage devices as recited in claim 17, wherein the internal connection attributes of the first device include an internal IP address and a random port associated with the first device.

19. The one or more memory storage devices as recited in claim 15, the acts further comprising communicating the lower bound and the upper bound of the external connection attributes associated with the first device to the second device.

20. The one or more memory storage devices as recited in claim 15, wherein establishing the connection comprises establishing the connection through a port of a symmetric NAT device.

* * * * *